(12) United States Patent
Kim et al.

(10) Patent No.: US 12,297,516 B2
(45) Date of Patent: May 13, 2025

(54) STEEL SHEET FOR HOT PRESS AND ALUMINUM COATED BLANK MANUFACTURED USING THE SAME

(71) Applicant: Hyundai Steel Company, Incheon (KR)

(72) Inventors: Je Woo Soo Kim, Incheon (KR); Byung Gil Yoo, Incheon (KR); Seong Kyung Han, Incheon (KR); Dong Yong Kim, Incheon (KR)

(73) Assignee: Hyundai Steel Company, Incheon (KR)

( * ) Notice: Subject to any disclaimer, the term of this patent is extended or adjusted under 35 U.S.C. 154(b) by 213 days.

(21) Appl. No.: 18/079,629

(22) Filed: Dec. 12, 2022

(65) Prior Publication Data
US 2023/0111519 A1    Apr. 13, 2023

Related U.S. Application Data

(63) Continuation of application No. PCT/KR2022/001251, filed on Jan. 24, 2022.

(30) Foreign Application Priority Data

Jul. 30, 2021  (KR) .................. 10-2021-0101017
Nov. 30, 2021  (KR) .................. 10-2021-0169341

(51) Int. Cl.
*C22C 38/00* (2006.01)
*B32B 15/01* (2006.01)
(Continued)

(52) U.S. Cl.
CPC .............. *C21D 9/46* (2013.01); *B32B 15/012* (2013.01); *C22C 38/002* (2013.01); *C22C 38/02* (2013.01);
(Continued)

(58) Field of Classification Search
CPC ....... C22C 38/002; C22C 38/02; C22C 38/04; C22C 38/24; C22C 38/26; C22C 38/28;
(Continued)

(56) References Cited

U.S. PATENT DOCUMENTS 9,725,782 B2    8/2017  Nonaka et al.
10,286,439 B2    5/2019  Jin et al.
(Continued)

FOREIGN PATENT DOCUMENTS

DE    112017007714 T5 *  3/2020  ............. B21D 22/02
EP    1 143 029 A1    10/2001
(Continued)

OTHER PUBLICATIONS

Office Action issued Feb. 2, 2024 in corresponding Japense Patent Application No. 2022-575483 (complete English translation).
(Continued)

*Primary Examiner* — Katherine A Christy
(74) *Attorney, Agent, or Firm* — Fox Rothschild LLP

(57) ABSTRACT

A steel sheet for hot press comprises carbon (C) in an amount of 0.03 to 0.15 wt %, silicon (Si) in an amount of 0.1 to 1.5 wt %, manganese (Mn) in an amount of 1.0 to 2.0 wt %, phosphorus (P) in an amount of 0.1 wt % or less, sulfur (S) in an amount of 0.01 wt % or less, boron (B) in an amount of 0.0005 to 0.005 wt %, a sum of one or more of titanium (Ti), niobium (Nb), and vanadium (V) in an amount of 0.01 to 1.0 wt %, chromium (Cr) in an amount of 0.01 to 0.5 wt %, the balance of iron (Fe), and other unavoidable impurities. The steel sheet for hot press includes MnS-based inclusions, and an area fraction of the MnS-based inclusions is 5% or less.

20 Claims, 8 Drawing Sheets

(51) Int. Cl.
  *C21D 9/46* (2006.01)
  *C22C 38/02* (2006.01)
  *C22C 38/04* (2006.01)
  *C22C 38/24* (2006.01)
  *C22C 38/26* (2006.01)
  *C22C 38/28* (2006.01)
  *C22C 38/32* (2006.01)
  *C23C 2/12* (2006.01)
  *C23C 2/40* (2006.01)

(52) U.S. Cl.
  CPC ............. *C22C 38/04* (2013.01); *C22C 38/24* (2013.01); *C22C 38/26* (2013.01); *C22C 38/28* (2013.01); *C22C 38/32* (2013.01); *C23C 2/12* (2013.01); *C23C 2/40* (2013.01); *C21D 2211/005* (2013.01); *C21D 2211/009* (2013.01)

(58) Field of Classification Search
  CPC ......... C22C 38/32; B32B 15/012; C21D 9/46; C23C 2/12; C23C 2/40
  USPC ......................................................... 428/653
  See application file for complete search history.

(56) References Cited

U.S. PATENT DOCUMENTS

| | | | |
|---|---|---|---|
| 10,544,475 | B2 | 1/2020 | Suwa et al. |
| 11,319,610 | B2 | 5/2022 | Drillet et al. |
| 11,621,807 | B2 | 4/2023 | Bai et al. |
| 11,939,651 | B2 | 3/2024 | Kim et al. |
| 2015/0361532 | A1* | 12/2015 | Nam ................ C22C 38/22 148/531 |
| 2018/0305785 | A1 | 10/2018 | Nakagawa et al. |
| 2018/0363117 | A1 | 12/2018 | Sohn et al. |
| 2021/0292866 | A1* | 9/2021 | Yoo ................ C21D 8/0426 |

FOREIGN PATENT DOCUMENTS

| | | |
|---|---|---|
| JP | 2009-256797 A | 11/2009 |
| JP | 2015-000431 A | 1/2015 |
| JP | 2017-078189 A | 4/2017 |
| JP | 2018-527457 A | 9/2018 |
| JP | 6813127 B1 | 1/2021 |
| KR | 10-2014-0102310 A | 8/2014 |
| KR | 101528011 B1 | 6/2015 |
| KR | 10-2015-0121163 A | 10/2015 |
| KR | 101637084 B1 | 7/2016 |
| KR | 10-2017-0138380 A | 12/2017 |
| KR | 10-2018-0074292 A | 7/2018 |
| KR | 10-2018-0095757 A | 8/2018 |
| KR | 10-2018-0132910 A | 12/2018 |
| KR | 10-2020-0000088 A | 1/2020 |
| WO | 2017-183719 A1 | 10/2017 |
| WO | 2019/201023 A1 | 10/2019 |
| WO | 2019/231023 A1 | 12/2019 |
| WO | 2021-095186 A1 | 5/2021 |

OTHER PUBLICATIONS

Decision on Rejection issued Aug. 23, 2024 in corresponding Japanese Patent Application No. JP 2022-575483.

Notification of Third Party Submission, issued Dec. 10, 2024 in corresponding Korean Patent Application No. KR 10-2023-0044298.

* cited by examiner

STEEL SHEET FOR HOT PRESS AND ALUMINUM COATED BLANK MANUFACTURED USING THE SAME

CROSS-REFERENCES TO RELATED APPLICATIONS

This Application is a continuation application of PCT/KR2022/001251 filed Jan. 24, 2022, which claims priority of Korean Patent Applications 10-2021-0101017 filed on Jul. 30, 2021 and 10-2021-0169341 filed on Nov. 30, 2021. The entire contents of these applications are incorporated herein by reference in their entirety.

TECHNICAL FIELD

The present invention relates to a steel sheet for hot press an aluminum-based plated blank manufactured by using the same.

BACKGROUND

As environmental regulations and fuel economy regulations are strengthened around the world, the need for lighter vehicle materials is increasing. Accordingly, research and development on ultra-high-strength steel and hot stamping steel are being actively conducted. Among them, the hot stamping process generally includes heating/forming/cooling/trimming, and uses the phase transformation of the material and the change of the microstructure during the process.

Recently, studies to improve delayed fracture and bendability in hot stamping parts manufactured by a hot stamping process have been actively conducted. As a related art, there is Korean Patent Application Publication No. 10-2018-0095757 (Title of the Invention: Method of Manufacturing Hot Stamping Part).

Meanwhile, in forming a hot stamping part through a hot stamping process, there are cases where different strength and bendability are partially required. Conventionally, a method of forming a part with a low-strength material and attaching a separate reinforcing material to a portion requiring high strength was used. However, the case where one part requires different strength by section, a material with high curability (or a thick material) was used for the upper portion, and a material with low strength and low curability (or a thin material) was used for the lower portion, the two materials were bonded by a laser to make blank, a hot stamping process was performed, and then a final product was manufactured.

Meanwhile, a tailer-welded blank (TWB) is a part manufactured by joining two or more steel sheet materials different in at least one of a material and a thickness. As a material for such a tailer-welded steel sheet, an Al—Si plated layer is used on the surface.

However, when the plated steel sheet material is joined with a laser, because the components of the plated layer penetrates into the molten pool of the junction (joint) portion, the junction portion has different properties from the parent material. When the plated layer is aluminum-silicon (Al—Si) or zinc (Zn)-based, the plating ingredient is mixed into the junction portion during laser bonding, and results in deterioration of mechanical properties.

Therefore, the strength degradation of the junction portion may be solved or minimized by a pillar wire ingredient, but the mixed plated layer ingredient (Al) may not be evenly diluted with the parent material depending on the material (material with a large amount of plating) and bonding conditions (high bonding speed). This may cause problems such as segregation and the like, so that the effect of the pillar wire ingredient alone may not be sufficient.

A related art to the present invention is disclosed in Republic of Korea Patent Registration No. 10-1637084 (published Jul. 6, 2016, title of invention: pillar wire and method of manufacturing customized welding blank using the same).

SUMMARY

Technical Problem

According to an exemplary embodiment of the present invention, provided is a steel sheet for hot press capable of controlling grain refinement and precipitation inclusion.

According to an exemplary embodiment of the present invention, provided is an aluminum-based plated blank having high-strength after a hot stamping process that uses a steel sheet for hot press.

Technical Solution

In an aspect of the present invention, provided is a steel sheet for hot press, including carbon (C) in an amount of 0.03 to 0.15 wt %, silicon (Si) in an amount of 0.1 to 1.5 wt %, manganese (Mn) in an amount of 1.0 to 2.0 wt %, phosphorus (P) in an amount of 0.1 wt % or less, sulfur (S) in an amount of 0.01 wt % or less, boron (B) in an amount of 0.0005 to 0.005 wt %, a sum of one or more of titanium (Ti), niobium (Nb), and vanadium (V) in an amount of 0.01 to 1.0 wt %, chromium (Cr) in an amount of 0.01 to 0.5 wt %, the balance of iron (Fe), and other unavoidable impurities, wherein the steel sheet for hot press includes MnS-based inclusions, and an area fraction of the MnS-based inclusions is 5% or less.

According to an exemplary embodiment, the steel sheet for hot press may have a width perpendicular to a rolling direction, and a maximum length of the MnS-based inclusion may be 200 μm or less at a ¼ point of the width.

According to an exemplary embodiment, the steel sheet for hot press may have a width perpendicular to a rolling direction, and a maximum length of the MnS-based inclusion may be 500 μm or less at a ½ point of the width.

According to an exemplary embodiment, the steel sheet for hot press may have a width in a direction perpendicular to a rolling direction, and an average length of the MnS-based inclusion may be 100 μm or less at a ¼ point of the width.

According to an exemplary embodiment, the steel sheet for hot press may have a width in a direction perpendicular to a rolling direction, and an average length of the MnS-based inclusion may be 200 μm or less at a ½ point of the width.

According to an exemplary embodiment, the steel sheet for hot press may have a width in a direction perpendicular to a rolling direction, and an average density of the MnS-based inclusion may be 20 pieces/mm$^2$ or less at a ¼ point of the width.

According to an exemplary embodiment, the steel sheet for hot press may have a width perpendicular to a rolling direction, and an average density of the MnS-based inclusion may be 40 pieces/mm$^2$ or less at a ½ point of the width.

According to an exemplary embodiment, the steel sheet for hot press may include 50 to 90% of ferrite and 30% or less of pearlite, as an area fraction (%).

According to an exemplary embodiment, an average grain size of the ferrite may be 1 to 10 μm.

According to an exemplary embodiment, the steel sheet for hot press may further include an iron (Fe)-based carbide, and an average diameter of the iron (Fe)-based carbide may be 100 nm or less.

In an aspect of the present invention, provided is an aluminum-based plated blank including a first plated steel sheet; a second plated steel sheet connected to the first plated steel sheet; and a joint connecting the first plated steel sheet and the second plated steel sheet at a boundary between the first plated steel sheet and the second plated steel sheet. The first plated steel sheet includes a first base iron and a first plated layer attached on at least one surface of the first base iron and including aluminum (Al), the second plated steel sheet includes a second base iron and a second plated layer attached on at least one surface of the second base iron and including aluminum (Al), the first base iron includes carbon (C) in an amount of 0.03 to 0.15 wt %, silicon (Si) in an amount of 0.1 to 1.5 wt %, manganese (Mn) in an amount of 1.0 to 2.0 wt %, phosphorus (P) in an amount of 0.1 wt % or less, sulfur (S) in an amount of 0.01 wt % or less, boron (B) in an amount of 0.0005 to 0.005 wt %, a sum of one or more of titanium (Ti), niobium (Nb), and vanadium (V) in an amount of 0.01 to 1.0 wt %, chromium (Cr) in an amount of 0.01 to 0.5 wt %, the balance of iron (Fe), and other unavoidable impurities, and the second base iron has a carbon (C) content of 0.15 wt % or more, and an area fraction of MnS-based inclusions in the first plated steel sheet is 5% or less.

According to an exemplary embodiment, a value obtained by multiplying a tensile strength of the first plated steel sheet by a thickness of the first plated steel sheet may be less than a value obtained by multiplying a tensile strength of the second plated steel sheet by a thickness of the second plated steel sheet.

The second base iron may include carbon (C) in an amount of 0.15 to 0.5 wt %, silicon (Si) in an amount of 0.1 to 0.8 wt %, manganese (Mn) in an amount of 0.3 to 2.0 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities, and further selectively include one or more of chromium (Cr) in an amount of 0.01 to 0.5 wt %, titanium (Ti) in an amount of 0.01 to 0.1 wt %, niobium (Nb) in an amount of 0.01 to 0.1 wt %, vanadium (V) in an amount of 0.01 to 0.1 wt %, molybdenum (Mo) in an amount of 0.01 to 0.5 wt %, nickel (Ni) in an amount of 0.01 to 0.5 wt %, and calcium (Ca) in an amount of 0.0001 to 0.005 wt %.

According to an exemplary embodiment, the second base iron may include carbon (C) v 0.2 to 0.3 wt %, silicon (Si) in an amount of 0.1 to 0.8 wt %, manganese (Mn) in an amount of 0.8 to 1.5 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities, and further selectively include one or more of chromium (Cr) in an amount of 0.05 to 0.3 wt %, titanium (Ti) in an amount of 0.01 to 0.1 wt %, and calcium (Ca) in an amount of 0.0001 to 0.003 wt %.

According to an exemplary embodiment, the second base iron may include carbon (C) in an amount of 0.25 to 0.5 wt %, silicon (Si) in an amount of 0.1 to 0.8 wt %, manganese (Mn) in an amount of 0.4 to 1.8 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities, and further selectively include one or more of chromium (Cr) in an amount of 0.01 to 0.5 wt %, titanium (Ti) in an amount of 0.01 to 0.1 wt %, niobium (Nb) in an amount of 0.01 to 0.1 wt %, molybdenum (Mo) in an amount of 0.01 to 0.4 wt %, and nickel (Ni) in an amount of 0.01 to 0.5 wt %.

According to an exemplary embodiment, the first plated steel sheet may have a width in a direction perpendicular to a rolling direction, and a maximum length of the MnS-based inclusions measured at a cut surface at a point ½ of the width may be 500 μm or less.

According to an exemplary embodiment, the first plated steel sheet may have a width in a direction perpendicular to a rolling direction, and an average length of the MnS-based inclusions measured at a cut surface at a point ½ of the width may be 200 μm or less.

According to an exemplary embodiment, the first plated steel sheet may have a width in a direction perpendicular to a rolling direction, and an average density of the MnS-based inclusions measured at a cut surface at a point ½ of the width may be 40 pieces/mm$^2$ or less.

According to an exemplary embodiment, the joint may include carbon (C) in an amount of 0.05 wt % or greater and less than 3.0 wt %, silicon (Si) in an amount of 0.01 wt % or greater and less than 1.0 wt %, manganese (Mn) in an amount of 0.5 wt % or greater and less than 3.0 wt %, phosphorus (P)) in an amount greater than 0 and less than 0.2 wt %, sulfur (S) in an amount greater than 0 and less than 0.2 wt %, titanium (Ti) in an amount greater than 0 wt % and less than 0.5 wt %, boron (B) in an amount of 0.0005 wt % or greater and less than 0.01 wt %, aluminum (Al) of greater than 0 wt % and less than 1.5 wt %, the balance of iron (Fe) and other unavoidable impurities.

According to an exemplary embodiment, the first plated steel sheet may further include an iron (Fe)-based carbide, and an average diameter of the iron (Fe)-based carbide may be 100 nm or less.

Advantageous Effects

The present invention enables grain refinement and control of precipitation inclusions, and through this, the present invention may provide a steel sheet for hot press having high strength after a hot stamping process and an aluminum-based plated blank manufactured using the same.

DETAILED DESCRIPTION

Figure 1:
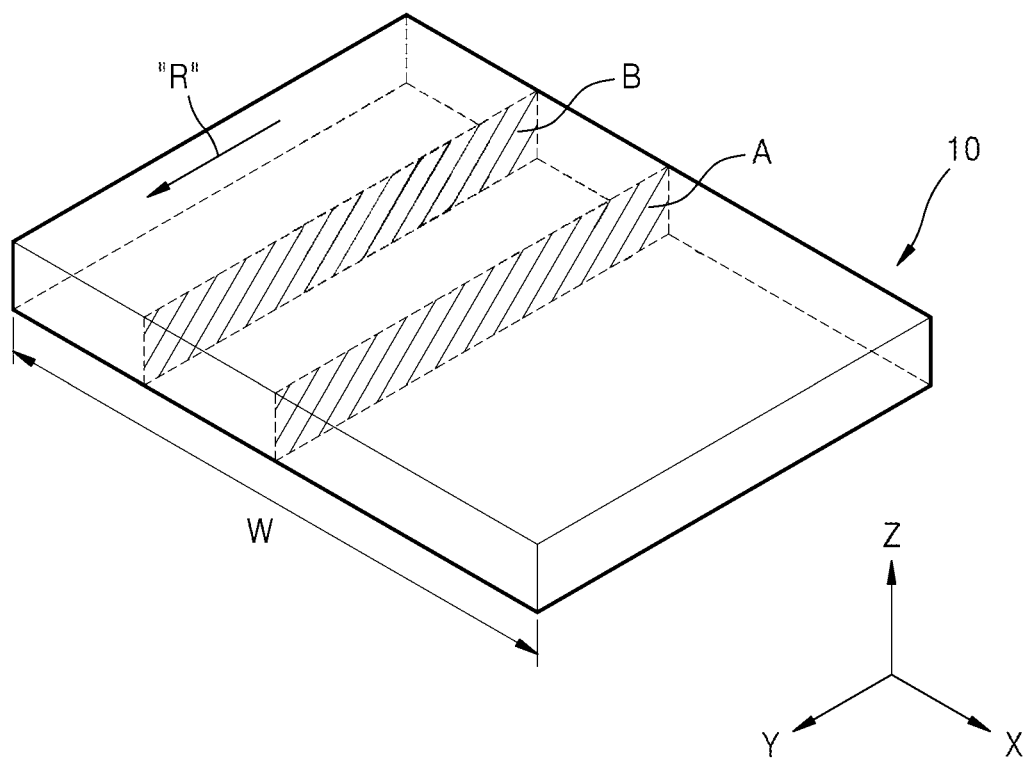
FIG. 1 shows a schematic perspective view of a steel sheet for hot press according to an exemplary embodiment of the present invention.

As the present invention allows for various changes and numerous embodiments, certain embodiments will be illustrated in the drawings and described in the written description. Effects and features of the present invention, and methods for achieving them will be clarified with reference to embodiments described below in detail with reference to the drawings. However, the present invention is not limited to the following embodiments and may be embodied in various forms.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or components but do not preclude the addition of one or more other features or components.

It will be further understood that, when a layer, region, or component is referred to as being "on" another layer, region, or component, it can be directly or indirectly on the other layer, region, or component. That is, for example, intervening layers, regions, or components may be present.

Sizes of elements in the drawings may be exaggerated or reduced for convenience of explanation. As an example, the size and thickness of each element shown in the drawings are arbitrarily represented for convenience of description, and thus, the present invention is not necessarily limited thereto.

In the case where a certain embodiment may be implemented differently, a specific process order may be performed in the order different from the described order. As an example, two processes successively described may be simultaneously performed substantially and performed in the opposite order.

FIG. 1 is a schematic perspective view of a steel sheet for hot press according to an exemplary embodiment of the present invention.

Referring to FIG. 1, a steel sheet 10 for hot press according to an embodiment of the present invention may include a first alloy composition. The first alloy composition may include carbon (C) in an amount of 0.03 to 0.15 wt %, silicon (Si) in an amount of 0.1 to 1.5 wt %, manganese (Mn) in an amount of 1.0 to 2.0 wt %, phosphorus (P) in an amount of 0.1 wt % or less, sulfur (S) in an amount of 0.01 wt % or less, boron (B) in an amount of 0.0005 to 0.005 wt %, chromium (Cr) in an amount of 0.01 to 0.5 wt %, the balance of iron (Fe), and other unavoidable impurities.

In addition, the first alloy composition may further include one or more of titanium (Ti), niobium (Nb), and vanadium (V). Specifically, a sum of one or more of titanium (Ti), niobium (Nb), and vanadium (V) may be an amount of 0.01 to 1.0 wt %.

Carbon (C) is a major element that determines the strength and hardness of steel, and after the hot stamping (or hot press) process, carbon may be added for the purpose of securing the tensile strength of the steel material. In addition, carbon may be added for the purpose of securing hardenability properties of the steel material. In an exemplary embodiment, carbon may be included in an amount of 0.03 to 0.15 wt % with respect to the total weight of the steel sheet 10 for hot press. In the case where carbon is included in an amount of less than 0.03 wt % with respect to the total weight of the steel sheet for hot press 10, it may be difficult to achieve the mechanical strength of the present invention. On the other hand, when carbon is included in an amount greater than 0.15 wt % with respect to the total weight of the steel sheet 10 for hot press, a problem of lowering the toughness of the steel or a problem of controlling the brittleness of the steel may be caused.

Silicon (Si) may function as a ferrite stabilizing element in the steel sheet 10 for hot press. Silicon (Si) improves ductility by cleaning ferrite, and suppresses low-temperature region carbide formation, thereby improving carbon concentration in austenite. Furthermore, silicon (Si) may be a key element in hot rolling, cold rolling, hot stamping homogenization (perlite, manganese segregation zone control), and fine dispersion of ferrite. In an exemplary embodiment, silicon may be included in an amount of 0.1 to 1.5 wt % with respect to the total weight of the steel sheet 10 for hot press. In the case where silicon is included in an amount of less than 0.1 wt % with respect to the total weight of the steel sheet 10 for hot press, the above function may not be sufficiently performed. On the other hand, when silicon is included in an amount greater than 1.5 wt % with respect to the total weight of the steel sheet 10 for hot press, the hot rolling and cold rolling loads increase, the hot rolling red scale becomes excessive, and the bondability may be deteriorated.

Manganese (Mn) may be added for the purpose of increasing hardenability and strength during heat treatment. In an exemplary embodiment, manganese may be included in an amount of 1.0 to 2.0 wt % with respect to the total weight of the steel sheet 10 for hot press. When manganese is included in an amount of less than 1.0 wt % with respect to the total weight of the steel sheet 10 for hot press, there may be a high possibility that the material is not enough (a hard phase fraction is not enough) after hot stamping due to insufficient hardenability. On the other hand, when manganese is included in an amount greater than 2.0 wt % with respect to the total weight of the steel sheet 10 for hot press, ductility and toughness due to manganese segregation or pearlite bands may be reduced, causing a decrease in bending performance and non-homogeneous microstructure may occur.

Meanwhile, manganese (Mn) contained in the steel sheet 10 for hot press may react with sulfur (S) to be described later to form MnS-based inclusions 10a (FIG. 2). When the manganese content exceeds 2.0 wt %, the MnS-based inclusions become coarse and it may be difficult to obtain excellent delayed fracture properties.

Phosphorus (P) is an element that segregates well and may be an element that inhibits the toughness of steel. In an exemplary embodiment, phosphorus (P) may be included in greater than 0 wt % and 0.1 wt % or less with respect to the total weight of the steel sheet 10 for hot press. When phosphorus is included in the above-described range with respect to the total weight of the steel sheet 10 for hot press, deterioration in the toughness of the steel may be prevented. On the other hand, when phosphorus is included in an amount greater than 0.1 wt % with respect to the total weight of the steel sheet 10 for hot press, it may cause cracks during the process, and the iron phosphide compound may be formed to reduce the toughness of the steel.

Sulfur(S) is a kind of impurity, and may be an element that inhibits processibility and physical properties of the steel sheet 10 for hot press. In an exemplary embodiment, sulfur may be included in greater than 0 wt % and 0.01 wt % or less with respect to the total weight of the steel sheet 10 for hot press. When sulfur is included in an amount greater than 0.01 wt % with respect to the total weight of the steel sheet 10 for hot press, hot processibility may be reduced, and surface defects such as cracks may occur due to the generation of giant inclusions.

Meanwhile, sulfur (S) may react with manganese (Mn) to form MnS-based inclusions 10a (FIG. 2) in the steel sheet 10 for hot press. The presence of coarse MnS-based inclusions may remarkably deteriorate the delayed fracture properties. For this reason, the sulfur content may act as a main factor in controlling the strength and bendability of the steel sheet 10 for hot press. When the sulfur content exceeds 0.01 wt %, coarse MnS-based inclusions increase and excellent delayed fracture properties are difficult to obtain. Therefore, it is required to set the sulfur content to 0.01 wt % or less in the present embodiment. In addition, it is preferable to remove sulfur as much as possible, and the sulfur content may be preferably 0.01% or less, more preferably 0.005% or less.

Boron (B) is added for the purpose of securing the hardenability and strength of steel by securing the martensite structure, and may have a grain refining effect by increasing the austenite grain growth temperature. In an exemplary embodiment, carbon may be included in an amount of 0.0005 to 0.005 wt % with respect to the total weight of the steel sheet 10 for hot press. When boron is included in the above-described range with respect to the total weight of the steel sheet 10 for hot press, it is possible to prevent the occurrence of hard phase brittleness at grain boundaries, and secure high toughness and bendability.

Chromium (Cr) may be added for the purpose of improving hardenability and strength of steel. In an exemplary embodiment, chromium may be included in an amount of 0.01 to 0.5 wt % with respect to the total weight of the steel sheet 10 for hot press. When chromium is included in the above-mentioned range with respect to the total weight of the steel sheet 10 for hot press, it is possible to improve the hardenability and strength of the steel, and to prevent an increase in production cost and a decrease in the toughness of the steel.

Titanium (Ti) may be added for the purpose of strengthening hardenability by forming precipitates and enhancing properties after hot stamping heat treatment. In addition, titanium forms a precipitation phase such as Ti(C,N) at a high temperature, thereby effectively contributing to austenite grain refinement. In addition, niobium (Nb) and vanadium (V) may be added for the purpose of increasing strength and toughness according to a decrease in the martensite packet size.

A sum of one or more of titanium, niobium, and vanadium may be in an amount of 0.01 to 1.0 wt % with respect to the total weight of the steel sheet 10 for hot press. When the titanium is included in the above-described range with respect to the total weight of the steel sheet 10 for hot press, continuous casting defects may be prevented and coarsening of the precipitates may be prevented, the physical properties of the steel material may be easily secured, and the occurrence of cracks in the surface of the steel material be prevented or minimized. When niobium and vanadium are included in the above-mentioned range with respect to the total weight of the steel sheet 10 for hot press, the grain refining effect of the steel is excellent in the hot rolling and cold rolling processes, the occurrences of cracks in the slab during steel making/continuous casting and a brittle fracture of the product are prevented, and the formation of steel-making coarse precipitates may be minimized.

In an exemplary embodiment, the steel sheet 10 for hot press may include an amount of 50% to 90% of ferrite and 30% or less of pearlite, as an area fraction (%). In addition, the steel sheet 10 for hot press may additionally include less than 10% of a remaining structure.

Ferrite has excellent ductility but is a soft structure, and may be included to improve elongation and bendability of the steel sheet 10 for hot press. Through the content of ferrite, the required strength and ductility of the steel sheet 10 for hot press may be controlled. However, when the content of ferrite is less than 50%, the bendability of the steel sheet 10 for hot press may be reduced. In addition, when the content of ferrite exceeds 90%, the strength of the steel sheet 10 for hot press is difficult to secure. In an exemplary embodiment, the grains of ferrite included in the steel sheet 10 for hot press may be 1 μm to 10 μm.

Pearlite is a hard structure dispersed in ferrite, in which soft ferrite and hard cementite are arranged in layers. In addition, pearlite is a structure which may raise the bending load of the steel sheet 10 for hot press. When the pearlite content of the soft surface layer exceeds 30%, the interface between the pearlite and the soft ferrite increases. Because the interface serves as a fracture origin at the time of plastic deformation, it may cause deterioration in the bendability of the steel sheet 10 for hot press.

The remaining structure other than ferrite and pearlite may be included in an amount of less than 10%, and when the remaining structure is present, it may be, for example, bainite, but the present invention is not limited thereto. The remaining structure may be 0%.

In an exemplary embodiment, the steel sheet 10 for hot press may include iron (Fe)-based carbide. The average diameter of the iron-based carbide may be 100 nm or less, preferably 10 nm to 100 nm. When the average diameter of the iron-based carbide is formed to exceed 100 nm, the bendability of the steel sheet 10 for hot press may be reduced.

In an exemplary embodiment, the steel sheet 10 for hot press may include MnS-based inclusions 10a (FIG. 2). Hereinafter, the MnS-based inclusions are described in detail with reference to FIG. 2.

Figure 2A:
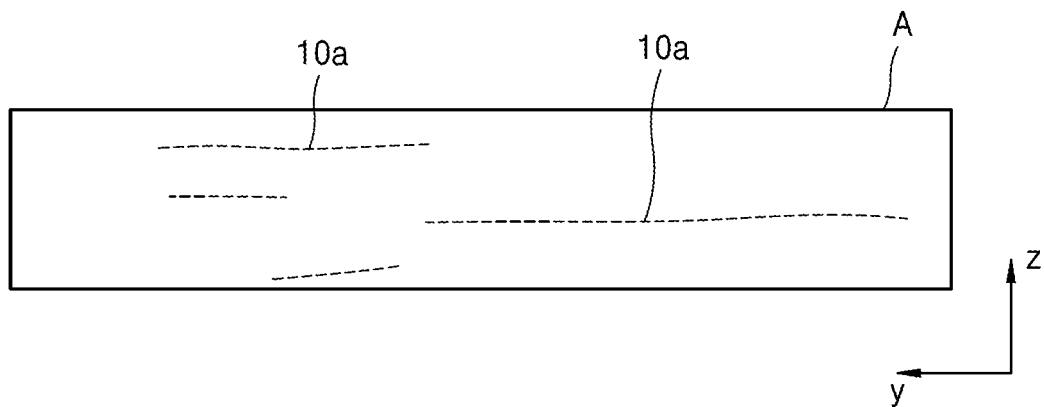
FIG. 2A shows a schematic cross-sectional view of a cross-section A of a steel sheet for hot press of FIG. 1.
Figure 2B:
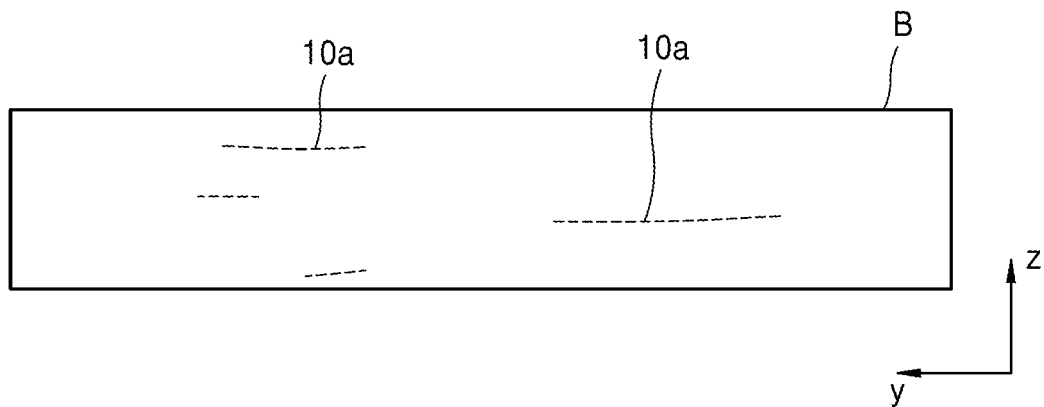
FIG. 2B shows a schematic cross-sectional view of a cross-section B of a steel sheet for hot press of FIG. 1.

FIG. 2A is a schematic cross-sectional view of a cross-section A of a steel sheet for hot press of FIG. 1, and FIG. 2B is a schematic cross-sectional view of a cross-section B of a steel sheet for hot press of FIG. 1.

Referring to 2A and 2B, the MnS-based inclusion 10a may be observed after mounting the cross-section of the steel sheet 10 for hot press of FIG. 1 in a direction (e.g., a y direction) horizontal to a rolling direction "R" as shown in FIG. 2A or 2B. The MnS-based inclusion 10a may be MnS particles precipitated by the reaction of manganese and sulfur while the steel sheet 10 for hot press is formed. MnS particles may form a group of MnS particles in the steel sheet 10 for hot press.

In an exemplary embodiment, the area fraction of the MnS-based inclusions 10a included in the steel sheet 10 for hot press may be 5% or less. When the area fraction of the MnS-based inclusions 10a exceeds 5%, the delayed fracture properties of the steel sheet 10 for hot press may be remarkably reduced. As described above, because the presence of the MnS-based inclusion 10a acts as a main cause of lowering the strength and bendability of the steel sheet 10 for hot press, it is important to control the MnS-based inclusion 10a.

As shown in FIGS. 2A and 2B, the MnS-based inclusion 10a may form a MnS particle group in the same direction (e.g., the y-direction) as the rolling direction "R". The MnS-based inclusions 10a constituting the MnS particle group may be linearly extended, may be distributed in a point-row shape, or may appear in a mixture of linear and point-row shapes. Accordingly, the MnS-based inclusion 10a may be provided to have a predetermined length in a specific direction. Hereinafter, in the present specification, the "length" of the MnS-based inclusions 10a refers to the length of an MnS particle in the rolling direction "R" when the MnS-based inclusions 10a include one linearly extended MnS particle. Alternatively, when the MnS-based inclusion 10a includes a point-row shape of a plurality of MnS particles or a linear and point-row shape are mixed, the "length" may mean a maximum distance between the MnS particles present at both ends in the rolling direction "R".

When defining the width in the direction (e.g., an x direction) perpendicular to the rolling direction "R" in the steel sheet 10 for hot press as a width W, FIG. 2A shows a cross-section at a ½ point of the width W of the steel sheet 10 for hot press of FIG. 1, and FIG. 2B shows a cross-section at a ¼ point of the width W of the steel sheet 10 for hot press of FIG. 1.

In an exemplary embodiment, the maximum length of the MnS-based inclusions 10a at ½ the width W of the steel sheet 10 for hot press may be 500 μm or less as shown in FIG. 2A. In addition, the maximum length of the MnS-based inclusions 10a at ½ the width W of the steel sheet 10 for hot press may be 200 μm or less as shown in FIG. 2B. When the maximum length of the MnS-based inclusions 10a at a point ½ of the width W of the steel sheet 10 for hot press exceeds 500 μm, or when the maximum length of the MnS-based inclusions 10a at a point ¼ of the width W of the steel sheet 10 for hot press exceeds 200 μm, the strength and bendability of the steel sheet 10 for hot press may be reduced.

In an exemplary embodiment, as shown in FIG. 2A, the average length of the MnS-based inclusions 10a at the ½ point of the width W of the steel sheet 10 for hot press may be 200 μm or less, more preferably 0 to 100 μm. In addition, as shown in FIG. 2B, the average length of the MnS-based inclusions 10a at the ¼ point of the width W of the steel sheet 10 for hot press may be 100 μm or less, more preferably 1 to 50 μm. When the average length of the MnS-based inclusions 10a at a point ½ of the width W of the steel sheet 10 for hot press exceeds 200 μm, or when the average length of the MnS-based inclusions 10a at a point ¼ of the width W of the steel sheet 10 for hot press exceeds 100 μm, the strength and bendability of the steel sheet 10 for hot press may be reduced.

In an exemplary embodiment, the average length of the MnS-based inclusions 10a at ½ the width W of the steel sheet 10 for hot press may be 40/mm$^2$ or less as shown in FIG. 2A. In addition, the average length of the MnS-based inclusions 10a at ¼ the width W of the steel sheet 10 for hot press may be 20/mm$^2$ or less as shown in FIG. 2B. When the average density of the MnS-based inclusions 10a at a point ½ of the width W of the steel sheet 10 for hot press exceeds 40/mm$^2$, or when the average density of the MnS-based inclusions 10a at a point ¼ of the width W of the steel sheet 10 for hot press exceeds 20/mm$^2$, it may be difficult to obtain the excellent delayed fracture properties of the steel sheet 10 for hot press. By controlling the MnS-based inclusions 10a generated in the steel sheet 10 for hot press according to the present embodiment to have the above-described range, a V-bending angle of 80 degrees or greater after hot-stamping the steel sheet 10 for hot press may be secured.

As may be seen from the above, the MnS-based inclusions 10a may have a tendency to be concentrated from the outer to the center of the steel sheet 10 for hot press.

Figure 3:
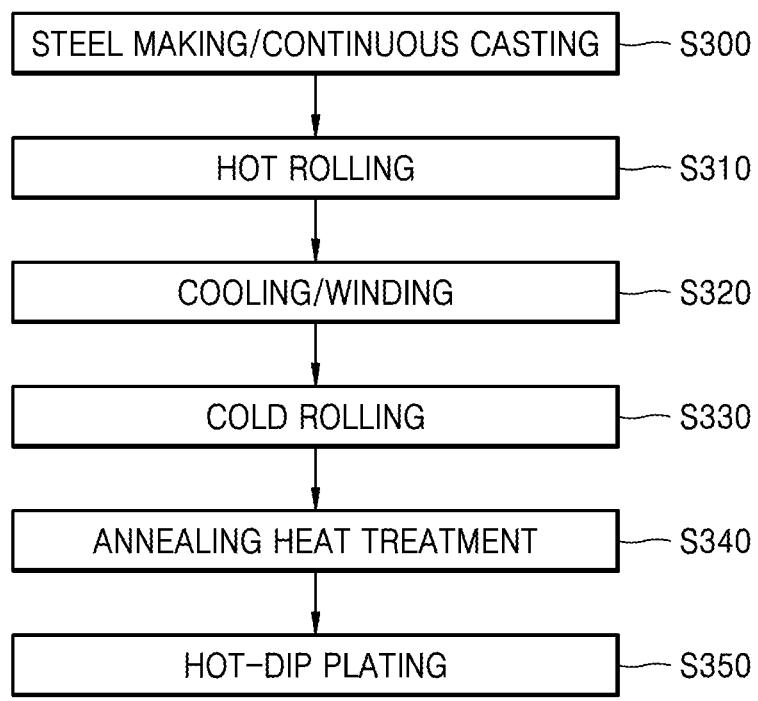
FIG. 3 shows a schematic flowchart showing a method of manufacturing a steel sheet for hot press of FIG. 1.

FIG. 3 is a schematic flowchart showing a method of manufacturing a steel sheet for hot press of FIG. 1. Hereinafter, a method of manufacturing a steel sheet for hot press is described with reference to FIGS. 1 and 3 together.

The method of manufacturing a steel sheet for hot press according to an embodiment of the present invention may include a steel making/continuous casting step (S300), a hot rolling step of a steel slab (S310), a cooling/winding step (S320), a cold rolling step (S330), an annealing heat treatment step (S340), and a hot-dip plating step (S350).

First, in the steel making/continuous casting step (S300), a steel slab in a semi-finished state that is the target of the process of forming a plated steel sheet is formed. The steel slab may include carbon (C) in an amount of 0.03 wt % to 0.15 wt %, silicon (Si) in an amount of 0.1 wt % to 1.5 wt %, manganese (Mn) in an amount of 1.0 wt % to 2.0 wt %, phosphorus (P) in an amount greater than 0 and 0.01 wt % or less, sulfur (S) in an amount greater than 0 and 0.01 wt % or less, boron (B) in an amount of 0.0005 wt % to 0.005 wt %, chromium (Cr) in an amount of 0.01 wt % to 0.5 wt %, a sum of at least one of titanium (Ti), niobium (Nb), and vanadium (V) in an amount of 0.01 wt % to 1.0 wt %, a remainder of iron (Fe) and other unavoidable impurities. At this case, because a ratio of sulfur (S) in an amount greater than 0 and 0.01 wt % or less is included during a process of manufacturing the steel slab, by controlling the length and density of MnS-based inclusions generated in the plated steel sheet, a V-bending angle may be secured greater than 80 degrees after hot stamping.

A reheating step of the steel slab is performed for hot rolling. In the steel slab reheating step, the segregated ingredients are re-dissolved during casting by reheating the steel slab secured through the continuous casting process to a predetermined temperature.

In the hot rolling step (S310), the reheated steel slab is hot rolled at a preset finish rolling temperature. In an exemplary embodiment, the finishing delivery temperature (FDT) may be Ms° C. or greater and 640° C. or less. At this case, the finishing delivery temperature (FDT) is lower than Ms° C., it is difficult to secure the processibility of the steel sheet due to generation of a mixed structure caused by rolling in an abnormal region, and not only processibility is deteriorated due to microstructure non-uniformity but also mass flow of the steel slab may be negatively affected by a sudden phase change during hot rolling. When the finishing delivery temperature (FDT) exceeds 640° C., the austenite grains are coarsened. In addition, there is a risk that the Nb-based precipitates and the TiC-based precipitates are coarsened to deteriorate the final part performance.

In the cooling/winding step (S320), the hot-rolled steel sheet is cooled to a preset coiling temperature (CT) and wound up. In an exemplary embodiment, the winding temperature may be 550° C. to 800° C. The winding temperature affects the redistribution of carbon (C), and when the winding temperature is less than 550° C., the fraction of the low-temperature phase due to overcooling increases, so that there is a danger that the strength increases and the rolling load during cold rolling intensifies, and the ductility is rapidly reduced. On the contrary, when the winding temperature exceeds 800° C., formability and strength deteriorate due to abnormal grain growth or excessive grain growth.

In the cold rolling step (S330), the wound steel sheet is uncoiled, pickled, and then cold rolled. In this case, the reduction ratio may be 55% or greater and 70% or less. When the reduction ratio is less than 55%, the recrystallized grains are not refined, and when the reduction ratio exceeds 70%, it is difficult to control the fracture of the steel sheet, and productivity is reduced. In the cold rolling step (S330), pickling is performed for the purpose of removing the scale of the wound steel sheet, that is, the hot rolled coil manufactured through the above hot rolling process.

The annealing heat treatment step (S340) is a step of annealing the cold rolled steel sheet at a temperature of 700° C. or higher. The annealing heat treatment may include heating the cold-rolled plate and cooling the heated cold-rolled plate at a preset cooling speed.

The hot-dip plating step (S350) is a step of forming a plated layer on the annealed heat-treated steel sheet. In the hot-dip plating step (S350), the plated layer may be formed on the annealed heat-treated steel sheet.

Figure 4A:
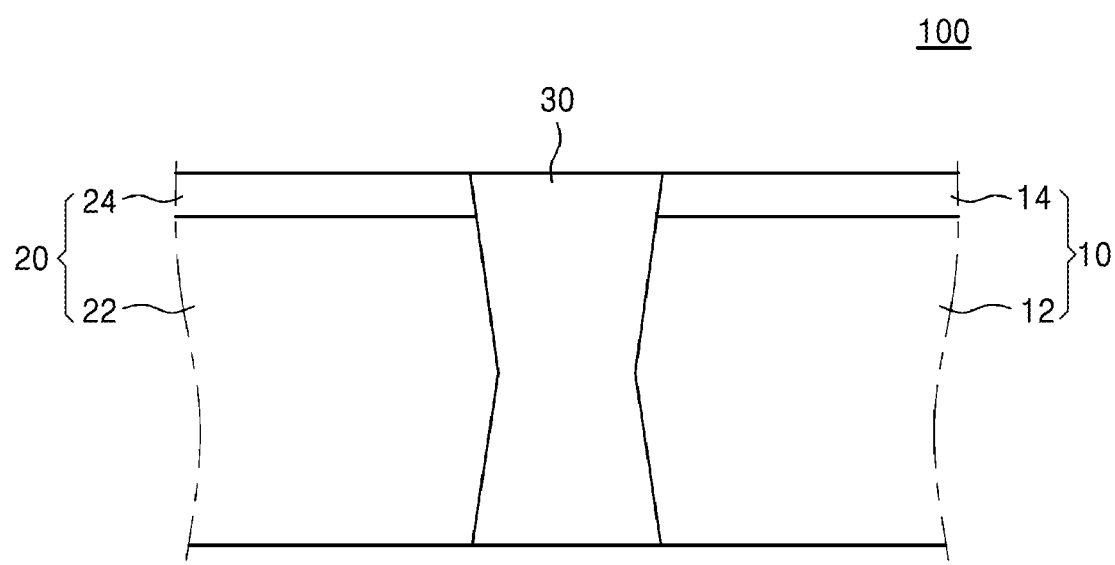
FIGS. 4A and 4B show schematic cross-sectional views of an aluminum-based plated blank according to an exemplary embodiment.
Figure 4B:
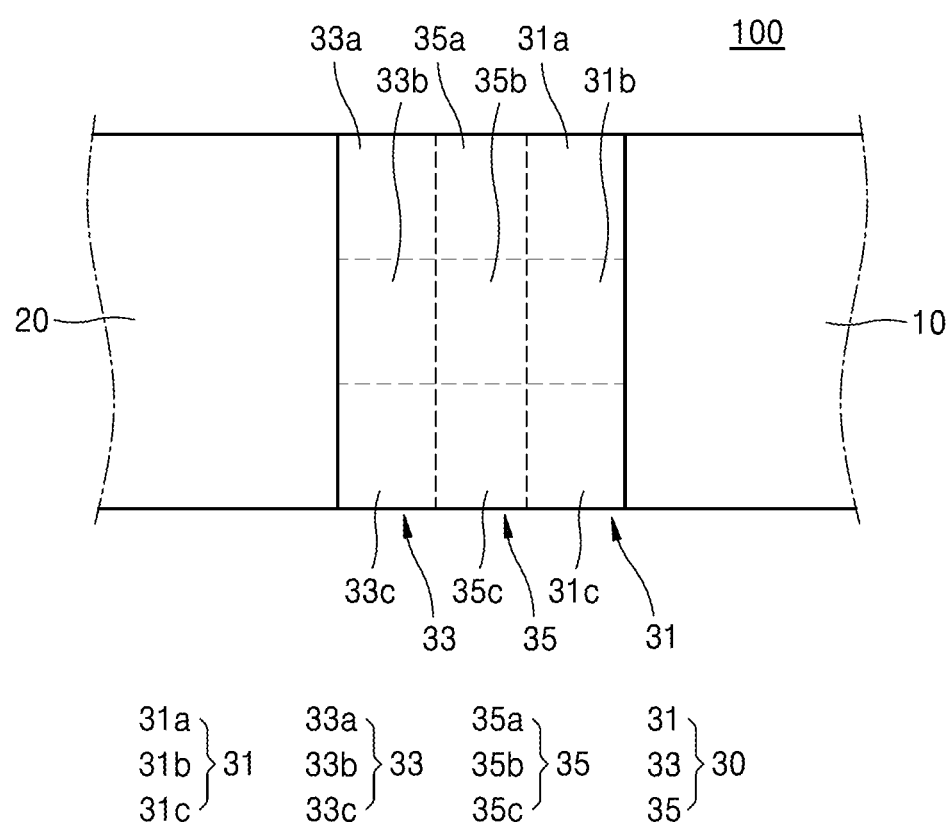
Figure 5A:
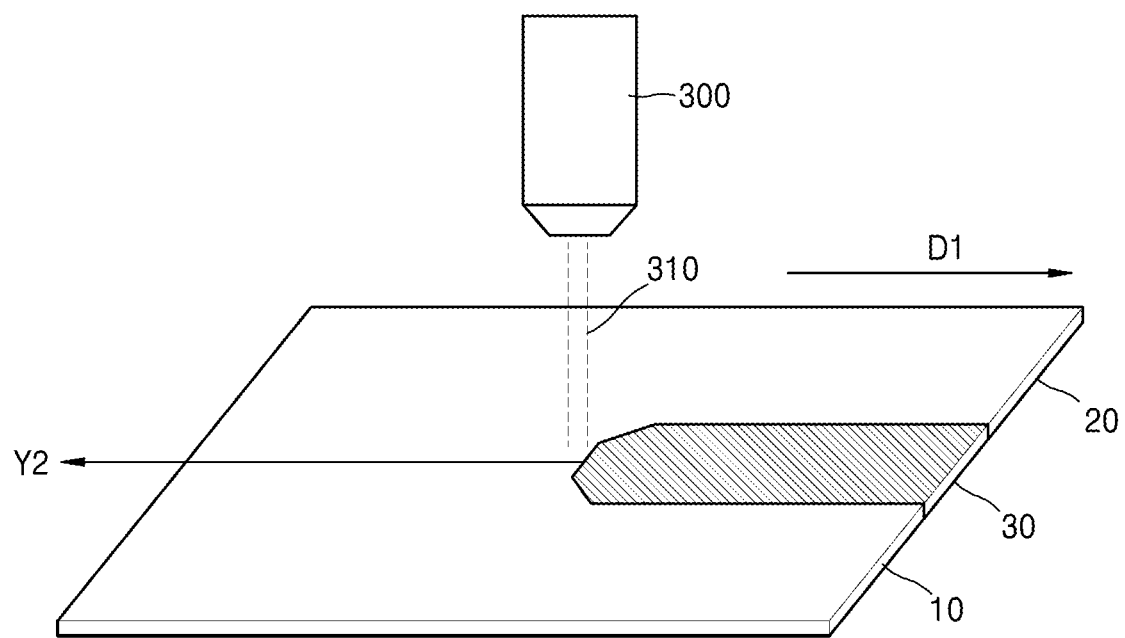
FIGS. 5A and 5B show schematic cross-sectional views of a process of manufacturing an aluminum-based plated blank according to an exemplary embodiment.
Figure 5B:
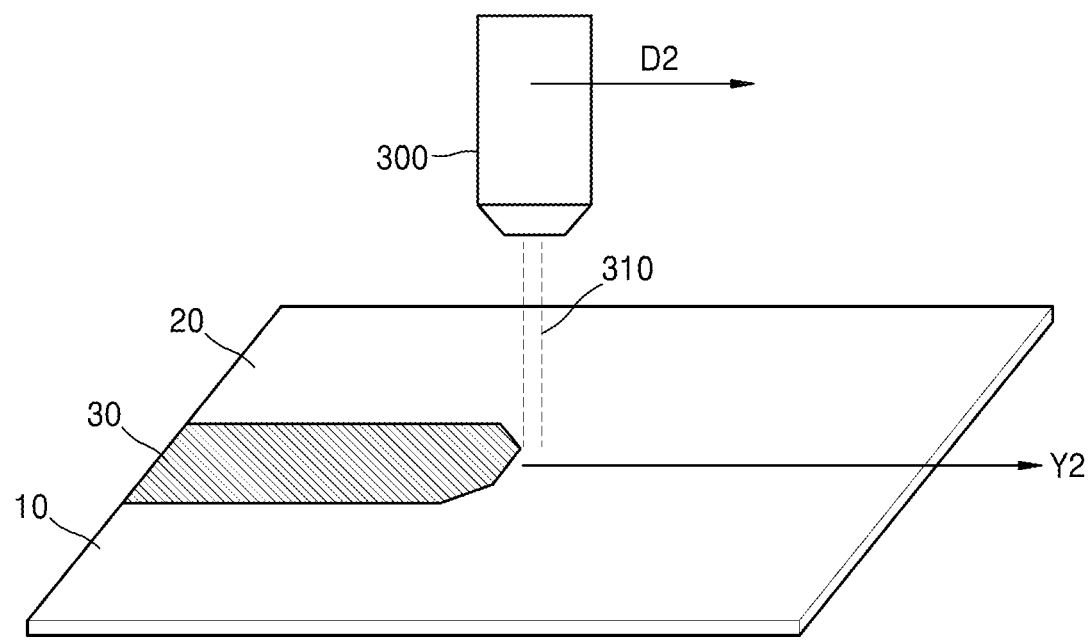

FIGS. 4A and 4B are cross-sectional views schematically showing an aluminum-based plated blank according to an embodiment of the present invention, respectively, FIGS. 5A and 5B are perspective views schematically showing a process of manufacturing an aluminum-based plated blank according to an embodiment of the present invention, respectively, and FIG. 6 is a plan view schematically showing a process of bonding an aluminum-based plated plate by irradiating a laser beam.

First, referring to FIG. 4A, an aluminum-based plated blank 100 according to an embodiment may include a first plated steel sheet 10, a second plated steel sheet 20 connected to the first plated steel sheet 10, and a joint 30 connecting the first plated steel sheet 10 to the second plated steel sheet 20 at a boundary between the first plated steel sheet 10 and the second plated steel sheet 20.

Because the aluminum-based plated blank 100 includes the first plated steel sheet 10 and the second plated steel sheet 20 having different thicknesses and/or ingredients, the aluminum-based plated blank 100 may be hot-stamped and then some section of the blank may absorb impact energy. For example, the aluminum-based plated blank 100 may include the first plated steel sheet 10 and the second plated steel sheet 20 having different strengths after hot stamping due to different ingredients but having the same thickness. Alternatively, the aluminum-based plated blank 100 may include the first plated steel sheet 10 and the second plated steel sheet 20 having different strengths after hot stamping due to different ingredients and having different thicknesses.

As described above, when the aluminum-based plated blank 100 includes the first plated steel sheet 10 and the second plated steel sheet 20 having different thicknesses and/or ingredients, the aluminum-based plated blank 100 may absorb impact energy through a steel sheet having a less value obtained by multiplying the tensile strength (MPa) by the thickness (mm) of the steel sheet among the steel sheet 10 and the second plated steel sheet 20.

More specifically, the first plated steel sheet 10 may have a first tensile strength and a first thickness, and the second plated steel sheet 20 may have a second tensile strength and a second thickness. In this case, the first tensile strength and the second tensile strength may be different from each other, and the first thickness and the second thickness may be the same or different from each other. In an exemplary embodiment, in the aluminum-based plated blank 100, a value obtained by multiplying the first tensile strength by the first thickness of the first plated steel sheet 10 may be less than a value obtained by multiplying the second tensile strength by the second thickness of the second plated steel sheet 20. In this case, the first plated steel sheet 10 having a relatively small value obtained by multiplying the tensile strength (MPa) and the thickness (mm) has better bendability than the second plated steel sheet 20, and thus, the first plated steel sheet 10 may absorb impact energy applied to the aluminum-based plated blank 100.

In an exemplary embodiment, the first plated steel sheet 10 included in the aluminum-based plating blank 100 may be the steel sheet 10 for hot press described with reference to FIGS. 1 to 3.

More specifically, the first plated steel sheet 10 may include a first base iron 12 and a first plated layer 14 formed on at least one surface of the first base iron 12. In addition, the second plated steel sheet 20 may include a second base iron 22 and a second plated layer 24 formed on at least one surface of the second base iron 22. The first base iron 12 and the second base iron 22 may include different ingredients. In this case, the first plated layer 14 and the second plated layer 24 may include the same ingredient or ingredients different from each other.

In an exemplary embodiment, the first base iron 12 of the first plated steel sheet 10 may include a first alloy composition. The first alloy composition may include carbon (C) in an amount of 0.03 wt % to 0.15 wt %, silicon (Si) in an amount of 0.1 wt % to 1.5 wt %, manganese (Mn) in an amount of 1.0 wt % to 2.0 wt %, phosphorus (P) in an amount greater than 0 and 0.01 wt % or less, sulfur (S) in an amount greater than 0 and 0.01 wt % or less, boron (B) in an amount of 0.0005 wt % to 0.005 wt %, chromium (Cr) in an amount of 0.01 wt % to 0.5 wt %, a sum of at least one of titanium (Ti), niobium (Nb), and vanadium (V) in an amount of 0.01 wt % to 1.0 wt %, the balance of iron (Fe) and other unavoidable impurities. In addition, the first alloy composition may further include one or more of titanium (Ti), niobium (Nb), and vanadium (V). Specifically, a sum of one or more of titanium (Ti), niobium (Nb), and vanadium (V) may be an amount of 0.01 to 1.0 wt %.

As described above, because the first plated steel sheet 10 includes the first base iron 12, it may be understood that the first plated steel sheet 10 includes the first alloy composition. Therefore, in the description below, when the first plated steel sheet 10 includes the alloy phase structure, carbides and inclusions, it may mean that the first base iron 12 includes the alloy phase structures, carbides and inclusions. This is equally applicable to the second plated steel sheet 20 described below.

Carbon (C) is a major element that determines the strength and hardness of steel, and after the hot stamping (or hot press) process, carbon may be added for the purpose of securing the tensile strength of the steel material. In addition, carbon may be added for the purpose of securing hardenability properties of the steel material. In an exemplary embodiment, carbon may be included in an amount of 0.03 to 0.15 wt % with respect to the total weight of the first base iron 12. In the case where carbon is included in an amount of less than 0.03 wt % with respect to the total weight of the first base iron 12, it may be difficult to achieve the mechanical strength of the present invention. On the other hand, when carbon is included in an amount greater than 0.15 wt % with respect to the total weight of the first base iron 12, a problem of lowering the toughness of the steel or a problem of controlling the brittleness of the steel may be caused.

Silicon (Si) may act as a ferrite stabilizing element in the first plated steel sheet 10. Silicon (Si) improves ductility by cleaning ferrite, and suppresses low-temperature region carbide formation, thereby improving carbon concentration in austenite. Furthermore, silicon (Si) may be a key element in hot rolling, cold rolling, hot stamping homogenization (perlite, manganese segregation zone control), and fine dispersion of ferrite. In an exemplary embodiment, silicon may be included in an amount of 0.1 to 1.5 wt % with respect to the total weight of the first base iron 12. In the case where silicon is included in an amount of less than 0.1 wt % with respect to the total weight of the first base iron 12, the above function may not be sufficiently performed. On the other hand, when silicon is included in an amount greater than 1.5 wt % with respect to the total weight of the first base iron 12, the hot rolling and cold rolling loads increase, the hot rolling red scale becomes excessive, and the bondability may be deteriorated.

Manganese (Mn) may be added for the purpose of increasing hardenability and strength during heat treatment. In an exemplary embodiment, manganese may be included in an amount of 1.0 to 2.0 wt % with respect to the total weight of the first base iron 12. When manganese is included in an amount of less than 1.0 wt % with respect to the total weight of the first base iron 12, there may be a high possibility that the material is not enough (a hard phase fraction is not enough) after hot stamping due to insufficient hardenability. On the other hand, when manganese is included in an amount greater than 2.0 wt % with respect to the total weight of the first base iron 12, ductility and toughness due to manganese segregation or pearlite bands may be reduced, causing a decrease in bending performance and non-homogeneous microstructure may occur.

Phosphorus (P) is an element that segregates well and may be an element that inhibits the toughness of steel. In an exemplary embodiment, phosphorus may be included in an amount greater than 0 wt % and 0.1 wt % or less with respect to the total weight of the first base iron 12. When phosphorus is included in the above-described range with respect to the total weight of the first base iron 12, deterioration in the toughness of the steel may be prevented. On the other hand, when phosphorus is included in an amount greater than 0.1 wt % with respect to the total weight of the first base iron 12, it may cause cracks during the process, and the iron phosphide compound may be formed to reduce the toughness of the steel.

Sulfur(S) is a kind of impurity, and may be an element that inhibits processibility and physical properties of the first plated steel sheet 10. In an exemplary embodiment, sulfur may be included in an amount greater than 0 wt % and 0.01 wt % or less with respect to the total weight of the first base iron 12. When sulfur is included in an amount greater than 0.01 wt % with respect to the total weight of the first base iron 12, hot workability may be reduced, and surface defects such as cracks may occur due to the generation of giant inclusions.

Meanwhile, sulfur (S) may react with manganese (Mn) to form MnS-based inclusions in the first plated steel sheet 10. The presence of coarse MnS-based inclusions may remarkably deteriorate the delayed fracture properties. For this reason, the sulfur content may act as a main factor in controlling the strength and bendability of the first plated steel sheet 10. When the sulfur content exceeds 0.01 wt % with respect to the total weight of the first base iron 12, coarse MnS-based inclusions increase and it is difficult to obtain excellent delayed fracture properties. Therefore, it is required to set the sulfur content to 0.01 wt % or less in the present embodiment. In addition, it is preferable to remove sulfur as much as possible, and the sulfur content may be preferably 0.01% or less, more preferably 0.005% or less.

Boron (B) is added for the purpose of securing the hardenability and strength of steel by securing the martensite structure, and may have a grain refining effect by increasing the austenite grain growth temperature. In an exemplary embodiment, boron may be included in an amount of 0.0005 to 0.005 wt % with respect to the total weight of the first base iron 12. When boron is included in the above-described range with respect to the total weight of the first base iron 12, it is possible to prevent the occurrence of hard phase brittleness at grain boundaries, and secure high toughness and bendability.

Chromium (Cr) may be added for the purpose of improving hardenability and strength of steel. In an exemplary embodiment, chromium may be included in an amount of 0.01 to 0.5 wt % with respect to the total weight of the first base iron 12. When chromium is included in the above-mentioned range with respect to the total weight of the first base iron 12, it is possible to improve the hardenability and strength of the steel, and to prevent an increase in production cost and a decrease in the toughness of the steel.

Titanium (Ti) may be added for the purpose of strengthening hardenability by forming precipitates and enhancing properties after hot stamping heat treatment. In addition, titanium forms a precipitation phase such as Ti (C,N) at a high temperature, thereby effectively contributing to austenite grain refinement. In addition, niobium (Nb) and vanadium (V) may be added for the purpose of increasing strength and toughness according to a decrease in the martensite packet size.

A sum of one or more of titanium, niobium, and vanadium may be an amount of 0.01 to 1.0 wt % with respect to the total weight of the first base iron 12. When the titanium is included in the above-described range with respect to the total weight of the first base iron 12, continuous casting defects may be prevented and coarsening of the precipitates may be prevented, the physical properties of the steel material may be easily secured, and the occurrence of cracks on the surface of the steel material be prevented or minimized. When niobium and vanadium are included in the above-mentioned range with respect to the total weight of the first base iron 12, the grain refining effect of the steel is excellent in the hot rolling and cold rolling processes, the occurrences of cracks in the slab during steel making/continuous casting and a brittle fracture of the product are prevented, and the formation of steel-making coarse precipitates may be minimized.

In an exemplary embodiment, the first base iron 12 may include an amount of 50% to 90% of ferrite and 30% or less of pearlite, as an area fraction (%). In addition, the first base iron 12 may additionally include less than 10% of a remaining structure.

Ferrite has excellent ductility but is a soft structure, and may be included to improve elongation and bendability of the first plated steel sheet 10. Through the content of ferrite, the required strength and ductility of the first plated steel sheet 10 may be controlled. However, when the content of ferrite is less than 50%, the bendability of the first plated steel sheet 10 may be reduced. In addition, when the content of ferrite exceeds 90%, the strength of the first plated steel sheet 10 is difficult to secure. In an exemplary embodiment, the first plated steel sheet 10, that is, the grains of the ferrite included in the first base iron 12 may be 1 µm to 10 µm.

Pearlite is a hard structure dispersed in ferrite, in which soft ferrite and hard cementite are arranged in layers. In addition, pearlite is a structure which may raise the bending load of the first plated steel sheet 10. When the pearlite content of the soft surface layer exceeds 30%, the interface between the pearlite and the soft ferrite increases. Because the interface serves as a fracture origin at the time of plastic deformation, it may cause deterioration in the bendability of the first plated steel sheet 10.

The remaining structure other than ferrite and pearlite may be included in less than 10%, and when the remaining structure is present, it may be, for example, bainite, but the present invention is not limited thereto. The remaining structure may be 0%.

In an exemplary embodiment, the first plated steel sheet 10 may include iron (Fe)-based carbide. The average diameter of the iron-based carbide may be 100 nm or less, preferably 10 nm to 100 nm. When the average diameter of the iron-based carbide is formed to exceed 100 nm, the bendability of the first plated steel sheet 10 may be reduced.

In an exemplary embodiment, the first plated steel sheet 10 may include the MnS-based inclusion 10a described with reference to FIGS. 1, 2A, and 2B.

Referring to FIGS. 1, 2A, 2B and 4A together, the first plated steel sheet 10 included in the aluminum-based plated blank 100 may be a steel for 10 for hot press described with reference to FIGS. 1, 2A and 2B. When the first plated steel sheet 10 includes MnS-based inclusions, it may mean that the first base 12 includes MnS-based inclusions. Because a method of measuring the MS-based inclusions and the shape thereof is the same as that described with reference to FIGS. 1, 2A, and 2B, the descriptions thereof are omitted.

In an exemplary embodiment, the area fraction of the MnS-based inclusions 10a included in the first plated steel sheet 10 may be 5% or less. When the area fraction of the MnS-based inclusions 10a exceeds 5%, the delayed fracture properties of the first plated steel sheet 10 may be remarkably reduced. As described above, because the presence of the MnS-based inclusion 10a acts as a main cause of lowering the strength and bendability of the first plated steel sheet 10, it is important to control the MnS-based inclusion 10a.

In an exemplary embodiment, the maximum length of the MnS-based inclusions 10a at ½ the width W of the steel sheet 10 for hot press may be 500 μm or less as shown in FIG. 2A. In addition, the maximum length of the MnS-based inclusions 10a at ½ the width W of the steel sheet 10 for hot press may be 200 μm or less as shown in FIG. 2B. When the maximum length of the MnS-based inclusions 10a at a point ½ of the width W of the steel sheet 10 for hot press exceeds 500 μm, or when the maximum length of the MnS-based inclusions 10a at a point ¼ of the width W of the steel sheet 10 for hot press exceeds 200 μm, the strength and bendability of the steel sheet 10 for hot press may be reduced.

In an exemplary embodiment, as shown in FIG. 2A, the average length of the MnS-based inclusions 10a at the ½ point of the width W of the steel sheet 10 for hot press may be 200 μm or less, more preferably 0 to 100 μm. In addition, as shown in FIG. 2B, the average length of the MnS-based inclusions 10a at the ¼ point of the width W of the steel sheet 10 for hot press may be 100 μm or less, more preferably 1 to 50 μm. When the average length of the MnS-based inclusions 10a at a point ½ of the width W of the steel sheet 10 for hot press exceeds 200 μm, or when the average length of the MnS-based inclusions 10a at a point ¼ of the width W of the steel sheet 10 for hot press exceeds 100 μm, the strength and bendability of the steel sheet 10 for hot press may be reduced.

In an exemplary embodiment, the average length of the MnS-based inclusions 10a at ½ the width W of the steel sheet 10 for hot press may be 40/mm² or less as shown in FIG. 2A. In addition, the average length of the MnS-based inclusions 10a at ¼ the width W of the steel sheet 10 for hot press may be 20/mm² or less as shown in FIG. 2B. When the average density of the MnS-based inclusions 10a at a point ½ of the width W of the steel sheet 10 for hot press exceeds 40/mm², or when the average density of the MnS-based inclusions 10a at a point ¼ of the width W of the steel sheet 10 for hot press exceeds 20/mm², it may be difficult to obtain the excellent delayed fracture properties of the steel sheet 10 for hot press. By controlling the MnS-based inclusions 10a generated in the steel sheet 10 for hot press according to the present embodiment to have the above-described range, a V-bending angle of 80 degrees or greater after hot-stamping the steel sheet 10 for hot press may be secured.

The second plated steel sheet 20 may have an alloy composition different from that of the first plated steel sheet 10. In other words, it may mean that the second base iron 22 of the second plated steel sheet 20 has an alloy composition different from that of the first base iron 12 of the first plated steel sheet 10.

In an exemplary embodiment, the second base iron 22 of the second plated steel sheet 20 may include a second alloy composition. The second alloy composition may include carbon (C) in an amount of 0.15 to 0.5 wt %, silicon (Si) in an amount of 0.1 to 0.8 wt %, manganese (Mn) in an amount of 0.3 to 2.0 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities. In addition, the second alloy composition may selectively further include one or more of chromium (Cr) in an amount of 0.01 to 0.5 wt %, titanium (Ti) in an amount of 0.01 to 0.1 wt %, niobium (Nb) in an amount of 0.01 to 0.1 wt %, vanadium (V) in an amount of 0.01 to 0.1 wt %, molybdenum (Mo) in an amount of 0.01 to 0.5 wt %, nickel (Ni) in an amount of 0.01 to 0.5 wt %, and calcium (Ca) in an amount of 0.0001 to 0.005 wt %.

In the second alloy composition, carbon may be included in an amount of 0.15 to 0.5 wt % with respect to the total weight of the second base iron 22. In the case where carbon is included in an amount of less than 0.15 wt % with respect to the total weight of the second base iron 22, it may be difficult to achieve the mechanical strength of the present invention. On the other hand, when carbon is included in an amount greater than 0.5 wt % with respect to the total weight of the second plated steel sheet 20, a problem of lowering the toughness of the steel or a problem of controlling the brittleness of the steel may be caused.

In the second alloy composition, silicon may be included in an amount of 0.1 to 0.8 wt % with respect to the total weight of the second base iron 22. In the case where silicon is included in an amount of less than 0.1 wt % with respect to the total weight of the second base iron 22, the above function may not be sufficiently performed. On the other hand, when silicon is included in an amount greater than 0.8 wt % with respect to the total weight of the second base iron 22, the hot rolling and cold rolling loads increase, the hot rolling red scale becomes excessive, and the bondability may be deteriorated.

In the second alloy composition, manganese may be included in an amount of 0.3 to 2.0 wt % with respect to the total weight of the second base iron 22. When manganese is included in an amount of less than 0.3 wt % with respect to the total weight of the second base iron 22, there may be a high possibility that the material is not enough (a hard phase fraction is not enough) after hot stamping due to insufficient hardenability. On the other hand, when manganese is included in an amount greater than 2.0 wt % with respect to the total weight of the second base iron 22, ductility and toughness due to manganese segregation or pearlite bands may be reduced, causing a decrease in bending performance and non-homogeneous microstructure may occur.

In the second alloy composition, phosphorus (P) is an element that segregates well and may be an element that inhibits the toughness of steel. In an exemplary embodiment, phosphorus may be included in an amount of 0.05 wt % or less with respect to the total weight of the second base iron 22. When phosphorus is included in the above-described range with respect to the total weight of the second base iron 22, deterioration in the toughness of the steel may be prevented. On the other hand, when phosphorus is included in an amount greater than 0.1 wt % with respect to the total weight of the second base iron 22, it may cause cracks during the process, and the iron phosphide compound may be formed to reduce the toughness of the steel.

In the second alloy composition, sulfur (S) is a kind of impurity, and may be an element that inhibits processibility and physical properties of the first plated steel sheet 10. In an exemplary embodiment, sulfur may be included in an amount of 0.01 wt % or less with respect to the total weight of the second base iron 22. When sulfur is included in an amount greater than 0.01 wt % with respect to the total weight of the second base iron 22, hot workability may be reduced, and surface defects such as cracks may occur due to the generation of giant inclusions.

In the second alloy composition, boron (B) is added for the purpose of securing the hardenability and strength of steel by securing the martensite structure, and may have a grain refining effect by increasing the austenite grain growth temperature. In an exemplary embodiment, boron may be included in an amount of 0.001 to 0.005 wt % with respect to the total weight of the second base iron 22. When boron is included in the above-described range with respect to the total weight of the second base iron 22, it is possible to prevent the occurrence of hard phase brittleness at grain boundaries, and secure high toughness and bendability.

In an exemplary embodiment, the second base iron 22 of the second plated steel sheet 20 may include a third alloy composition. The third alloy composition may include carbon (C) in an amount of 0.2 to 0.3 wt %, silicon (Si) in an amount of 0.1 to 0.8 wt %, manganese (Mn) in an amount of 0.8 to 1.5 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities. In addition, the third alloy composition may selectively further include one or more of chromium (Cr) in an amount of 0.05 to 0.3 wt %, titanium (Ti) in an amount of 0.01 to 0.1 wt %, and calcium (Ca) in an amount of 0.0001 to 0.003 wt %.

In the third alloy composition, carbon may be included in an amount of 0.2 to 0.3 wt % with respect to the total weight of the second base iron 22. In the case where carbon is included in an amount of less than 0.2 wt % with respect to the total weight of the second base iron 22, it may be difficult to achieve the mechanical strength of the present invention. On the other hand, when carbon is included in an amount greater than 0.3 wt % with respect to the total weight of the second plated steel sheet 20, a problem of lowering the toughness of the steel or a problem of controlling the brittleness of the steel may be caused.

In the third alloy composition, silicon may be included in an amount of 0.1 to 0.8 wt % with respect to the total weight of the second base iron 22. In the case where silicon is included in an amount of less than 0.1 wt % with respect to the total weight of the second base iron 22, the above function may not be sufficiently performed. On the other hand, when silicon is included in an amount greater than 0.8 wt % with respect to the total weight of the second base iron 22, the hot rolling and cold rolling loads increase, the hot rolling red scale becomes excessive, and the bondability may be deteriorated.

In the third alloy composition, manganese may be included in an amount of 0.8 to 1.5 wt % with respect to the total weight of the second base iron 22. When manganese is included in an amount of less than 0.8 wt % with respect to the total weight of the second base iron 22, there may be a high possibility that the material is not enough (a hard phase fraction is not enough) after hot stamping due to insufficient hardenability. On the other hand, when manganese is included in an amount greater than 1.5 wt % with respect to the total weight of the second base iron 22, ductility and toughness due to manganese segregation or pearlite bands may be reduced, causing a decrease in bending performance and non-homogeneous microstructure may occur.

In the third alloy composition, phosphorus (P) is an element that segregates well and may be an element that inhibits the toughness of steel. In an exemplary embodiment, phosphorus may be included in an amount of 0.05 wt % or less with respect to the total weight of the second base iron 22. When phosphorus is included in the above-described range with respect to the total weight of the second base iron 22, deterioration in the toughness of the steel may be prevented. On the other hand, when phosphorus is included in an amount greater than 0.1 wt % with respect to the total weight of the second base iron 22, it may cause cracks during the process, and the iron phosphide compound may be formed to reduce the toughness of the steel.

In the third alloy composition, sulfur (S) is a kind of impurity, and may be an element that inhibits processibility and physical properties of the first plated steel sheet 10. In an exemplary embodiment, sulfur may be included in an amount of 0.01 wt % or less with respect to the total weight of the second base iron 22. When sulfur is included in an amount greater than 0.01 wt % with respect to the total weight of the second base iron 22, hot workability may be reduced, and surface defects such as cracks may occur due to the generation of giant inclusions.

In the third alloy composition, boron (B) is added for the purpose of securing the hardenability and strength of steel by securing the martensite structure, and may have a grain refining effect by increasing the austenite grain growth temperature. In an exemplary embodiment, boron may be included in an amount of 0.001 to 0.005 wt % with respect to the total weight of the second base iron 22. When boron is included in the above-described range with respect to the total weight of the second base iron 22, it is possible to prevent the occurrence of hard phase brittleness at grain boundaries, and secure high toughness and bendability.

In an exemplary embodiment, the second base iron 22 of the second plated steel sheet 20 may include a fourth alloy composition. The fourth alloy composition may include carbon (C) in an amount of 0.25 to 0.5 wt %, silicon (Si) in an amount of 0.1 to 0.8 wt %, manganese (Mn) in an amount of 0.4 to 1.8 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities. In addition, the fourth alloy composition may selectively further include one or more of chromium (Cr) in an amount of 0.01 to 0.5 wt %, titanium (Ti) in an amount of 0.01 to 0.1 wt %, niobium (Nb) in an amount of 0.01 to 0.1 wt %, molybdenum (Mo) in an amount of 0.01 to 0.4 wt %, and nickel (Ni) in an amount of 0.01 to 0.5 wt %.

In the fourth alloy composition, carbon may be included in an amount of 0.25 to 0.5 wt % with respect to the total weight of the second base iron 22. In the case where carbon is included in an amount of less than 0.25 wt % with respect to the total weight of the second base iron 22, it may be difficult to achieve the mechanical strength of the present invention. On the other hand, when carbon is included in an amount greater than 0.5 wt % with respect to the total weight of the second plated steel sheet 20, a problem of lowering the toughness of the steel or a problem of controlling the brittleness of the steel may be caused.

In the fourth alloy composition, silicon may be included in an amount of 0.1 to 0.8 wt % with respect to the total weight of the second base iron 22. In the case where silicon is included in an amount of less than 0.1 wt % with respect to the total weight of the second base iron 22, the above function may not be sufficiently performed. On the other hand, when silicon is included in an amount greater than 0.8 wt % with respect to the total weight of the second base iron 22, the hot rolling and cold rolling loads increase, the hot rolling red scale becomes excessive, and the bondability may be deteriorated.

In the fourth alloy composition, manganese may be included in an amount of 0.4 to 1.8 wt % with respect to the total weight of the second base iron 22. When manganese is included in an amount of less than 0.4 wt % with respect to the total weight of the second base iron 22, there may be a high possibility that the material is not enough (a hard phase fraction is not enough) after hot stamping due to insufficient hardenability. On the other hand, when manganese is included in an amount greater than 1.8 wt % with respect to the total weight of the second base iron 22, ductility and toughness due to manganese segregation or pearlite bands may be reduced, causing a decrease in bending performance and non-homogeneous microstructure may occur.

In the fourth alloy composition, phosphorus (P) is an element that segregates well and may be an element that inhibits the toughness of steel. In an exemplary embodiment, phosphorus may be included in an amount of 0.05 wt % or less with respect to the total weight of the second base iron 22. When phosphorus is included in the above-described range with respect to the total weight of the second base iron 22, deterioration in the toughness of the steel may be prevented. On the other hand, when phosphorus is included in an amount greater than 0.1 wt % with respect to the total weight of the second base iron 22, it may cause cracks during the process, and the iron phosphide compound may be formed to reduce the toughness of the steel.

In the fourth alloy composition, sulfur (S) is a kind of impurity, and may be an element that inhibits processibility and physical properties of the first plated steel sheet 10. In an exemplary embodiment, sulfur may be included in an amount of 0.01 wt % or less with respect to the total weight of the second base iron 22. When sulfur is included in an amount greater than 0.01 wt % with respect to the total weight of the second base iron 22, hot workability may be reduced, and surface defects such as cracks may occur due to the generation of giant inclusions.

In the fourth alloy composition, boron (B) is added for the purpose of securing the hardenability and strength of steel by securing the martensite structure, and may have a grain refining effect by increasing the austenite grain growth temperature. In an exemplary embodiment, boron may be included in an amount of 0.001 to 0.005 wt % with respect to the total weight of the second base iron 22. When boron is included in the above-described range with respect to the total weight of the second base iron 22, it is possible to prevent the occurrence of hard phase brittleness at grain boundaries, and secure high toughness and bendability.

As described above, when the first plated steel sheet 10 included in the aluminum-based plating blank 100 has the first alloy composition, and the second plated steel sheet 20 has the second alloy composition, the third alloy composition, or the fourth alloy composition, a value obtained by multiplying the first tensile strength by the first thickness of the first plated steel sheet 10 may be less than a value obtained by multiplying the second tensile strength by the second thickness of the second plated steel sheet 20. Accordingly, the impact energy applied to the aluminum-based plated blank 100 may be absorbed by the first plated steel sheet 10. In other words, it may mean that the bendability of the first plated steel sheet 10 is relatively better. The bendability of the first plated steel sheet 10 may be improved by controlling the MnS-based inclusions included in the first plated steel sheet 10.

In an exemplary embodiment, the first plated layer 14 and the second plated layer 24 may include the same ingredient. Hereinafter, though description is made to the first plated layer 14, for convenience of description, the description is equally applicable to the second plated layer 24.

In an exemplary embodiment, the first plated layer 14 may be formed in an adhesion amount of 20-100 g/m² on one surface. In addition, the first plated layer 14 includes aluminum (Al). In a specific embodiment, the first plated layer 14 may be formed by including steps of immersing the first base iron 12 in a plating bath containing at least one of molten aluminum and aluminum alloy of 600 to 800° C., then performing cooling at an average speed of 1 to 50° C./s.

The first plated layer 14 may be formed on at least one surface of the first base iron 12. The first plated layer 14 may include a diffusion layer and a surface layer sequentially stacked on the first base iron 12. The surface layer is a layer containing 80 wt % or greater of aluminum (Al) and may prevent oxidation of the first base iron 12. The diffusion layer is formed by mutual diffusion of iron (Fe) of the first base iron 12 and aluminum (Al) of the first plated layer 14, and the diffusion layer may include aluminum-iron (Al—Fe) and aluminum-iron-silicon (Al—Fe—Si) compounds. The diffusion layer may include an amount of 20 wt % to 60 wt % of iron (Fe), an amount of 30 wt % to 80 wt % of aluminum (Al), and an amount of 0.1 wt % to 40 wt % of silicon (Si).

In a specific embodiment, because the diffusion layer has a higher melting point than the surface layer, the liquid metal embrittlement phenomenon in which the surface layer is melted during the hot press process and aluminum (Al) penetrates into the structure of the first base iron 12 may be prevented or minimized.

In a specific embodiment, the amount of plating adhesion of the first plated layer 14 may be adjusted by immersing the first base iron 12 in the plating bath, spraying one or more of air and gas on the surface of the first base iron 12 to wipe the molten plated layer, and adjusting the spray pressure.

The plating adhesion amount may be formed to 20 to 150 g/m² on at least one surface of the first base iron 12. Preferably, the plating adhesion amount may be formed to 20 to 100 g/m² on at least one surface of the first base iron 12. When the plating adhesion amount is less than 20 g/m², corrosion resistance of a portion where the first plated layer 14 contacts the joint 30 after hot stamping may be reduced. On the other hand, when the plating adhesion amount is greater than 100 g/m², the amount of aluminum (Al) mixed into the joint 30 when the first plated steel sheet 10 is joined to the second plated steel sheet 20 increases, so that the aluminum (Al) segregation may occur.

In an exemplary embodiment, the area fraction of the surface layer (cross-sectional area of the surface layer/cross-sectional area of the first plated layer), which is the ratio of the cross-sectional area of the surface layer to the cross-sectional area of the plated layer, may be 97% or less, preferably, 65% or greater and 97% or less. Here, the cross-sectional area of the first plated layer and the cross-sectional area of the surface layer mean cross-sectional areas at the same arbitrary position.

In an exemplary embodiment, the surface layer may include 80 wt % to 100 wt % of aluminum (Al), and the average thickness of the surface layer may be 10 μm to 40 μm. The surface layer is a layer having a high aluminum (Al) content, and when the area fraction of the surface layer exceeds 97% or the average thickness of the surface layer exceeds 40 μm, the amount of aluminum (Al) mixed into the joint 30 increases and aluminum (Al) segregation may occur. In addition, because the thickness of the diffusion layer becomes thinner, aluminum (Al) of the surface layer is melted during hot stamping so that the molten aluminum (Al) penetrates into the structure of the first base iron 12 or the structure of the first base iron 12, or penetrates into the interface portion between the joint portion 30 and the first base iron 12 through the structure of the first base iron 12. In addition, when the area fraction of the surface layer is less than 65% or the average thickness of the surface layer is less than 10 μm, because the thickness of the diffusion layer becomes thick, the productivity of the hot stamping part may be reduced. As described above, by controlling the average thickness and/or the area fraction of the surface layer within the above-described ranges, it is possible to prevent the aluminum (Al) in the first plating layer 14 from being melted and penetrating into the joint 30. Therefore, after hot stamping, a hot stamping part having excellent impact absorption ability may be obtained.

In a specific embodiment, the first plated layer 14 may include a surface layer and an alloying layer, wherein the surface layer is formed on the surface of the first base iron 12 and containing aluminum of 80 wt % or greater, and the alloying layer is formed between the surface layer and the first base iron 12, includes an intermetallic compound of aluminum-iron (Al—Fe) and aluminum-iron-silicon (Al—Fe—Si) and contains iron (Fe) in an amount of 20 to 70 wt %.

In a specific embodiment, the surface layer may contain aluminum in an amount of 80 to 100 wt % and have an average thickness of 10 to 40 μm. As an example, the average thickness of the surface layer may be 10 to 30 μm.

In a specific embodiment, the alloying layer may include iron (Fe) in an amount of 20 to 70 wt %. Under the above conditions, because the alloying layer has a high melting point, the surface layer is melted in a hot stamping furnace and penetrates into the structure of the first base iron 12 to prevent liquid metal embrittlement from occurring. As an example, the alloying layer may include iron (Fe) in an amount of 20 to 60 wt %.

The joint 30 may be formed by aligning the lateral surface of the first plated steel sheet 10 and the lateral surface of the second plated steel sheet 20 to face each other, irradiating a laser to a boundary between the first plated steel sheet 10 and the second plated steel sheet 20, and melting the interface between the first plated steel sheet 10 and the second plated steel sheet 20. Accordingly, the joint 30 may include in an amount greater than 0 wt % and 1.5 wt % or less of aluminum (Al), the remainder of the first plated steel sheet 10, and an ingredient mixed from the second plated steel sheet 20.

In an exemplary embodiment, the joint 30 may include carbon (C) in an amount of 0.05 wt % or greater and less than 3.0 wt %, silicon (Si) in an amount of 0.05 wt % or greater and less than 1.0 wt %, manganese (Mn) in an amount of 1.0 wt % or greater and less than 3.0 wt %, phosphorus (P) in an amount greater than 0 and less than 0.2 wt %, sulfur (S) in an amount greater than 0 and less than 0.2 wt %, titanium (Ti) in an amount of 0.01 wt % or greater and less than 0.5 wt %, boron (B) in an amount of 0.0005 wt % or greater and less than 0.01 wt %, aluminum (Al) in an amount greater than 0 wt % and 1.5 wt % or less, the balance of iron (Fe) and other unavoidable impurities. In addition, the joint 30 may further include one or more of niobium (Nb) in an amount of 0.01 wt % or greater and less than 1.5 wt % and chromium (Cr) in an amount of 0.05 wt % or greater and less than 2.0 wt %.

The joint 30 may include greater than 0 wt % and 1.5 wt % or less of aluminum (Al). When the aluminum (Al) content of the joint 30 is greater than 1.5 wt %, the joint may be softened, the martensite fraction of the joint may be lowered after hot stamping, and the mechanical properties of the aluminum-based plating blank 100 may be deteriorated. In addition, when an impact is applied after hot stamping due to segregation of aluminum (Al) in the joint 30, the impact may not be absorbed in the first plated steel sheet 10 and fracture may occur in the joint portion 30.

The joint 30 may include an amount of 0.05 wt % or greater and less than 3.0 wt % of carbon (C). When the carbon (C) content of the joint 30 is less than 0.05 wt %, because the joint 30 is softened and the hardness of the joint 30 is less than those of the first plated steel sheet 10 and the second plated steel sheet 20, breakage may occur in the joint 30. On the other hand, when the carbon (C) content is 1.0 wt % or greater, the hardness of the joint 30 is excessively increased and brittle fracture may occur in the joint 30 due to an external impact or the like.

The joint 30 may include an amount of 0.05 wt % or greater and 1.0 wt % or less of silicon (C). When the content of silicon (Si) included in the joint 30 is less than 0.05 wt %, brittle fracture may occur in the joint 30. On the other hand, when the content of silicon (Si) included in the joint 30 is 1.0 wt % or greater, slag may be generated on the surface of the bead.

The joint 30 may include an amount of 1.0 wt % or greater and less than 3.0 wt % of manganese (Mn). When the manganese content of the joint 30 is less than 1.0 wt %, because the joint 30 is softened during the hot stamping and the hardness of the joint 30 is less than those of the first plated steel sheet 10 and the second plated steel sheet 20, breakage may occur in the joint 30. On the other hand, when the content of manganese (Mn) is 3.0 wt % or greater, the hardness of the joint 30 is excessively increased and brittle fracture may occur in the joint 30 due to an external impact and the like, and the quality of the shape of the joint 30 may be deteriorated and cracks may occur in the joint 30 due to the drop in the viscosity of the joint 30 while the joint 30 is melted, and the expansion of the coefficient of expansion during transformation into a solid phase.

The joint 30 may contain an amount greater than 0 and less than 0.2 wt % of phosphorus (P). When the phosphorus (P) content of the joint 30 is 0.2 wt % or greater, brittle fracture due to segregation may occur in the joint 30.

The joint 30 may contain an amount greater than 0 and less than 0.2 wt % of sulfur (S). When the content of sulfur (S) in the joint 30 is 0.2 wt % or greater, cracks may occur in the joint 30 due to the formation of inclusions.

The joint 30 may include an amount of 0.01 wt % or greater and less than 0.5 wt % of titanium (Ti). When the titanium (Ti) content of the joint 30 is less than 0.01 wt %, because the joint 30 is softened during hot stamping and the hardness of the joint 30 is less than those of the first plated steel sheet 10 and the second plated steel sheet 20, the joint 30 may be broken. On the other hand, when the titanium (Ti) content of the joint 30 is 0.5 wt % or greater, brittle fracture may occur in the joint 30.

The joint 30 may include an amount of 0.0005 wt % or greater and less than 0.01 wt % of boron (B). When the boron (B) content of the joint 30 is less than 0.0005 wt %, because the joint 30 is softened during hot stamping and the hardness of the joint 30 is less than those of the first plated steel sheet 10 and the second plated steel sheet 20, the joint 30 may be broken. On the other hand, when the boron (B) content of the joint 30 is 0.01 wt % or greater, brittle fracture may occur in the joint 30.

Referring to FIG. 4B, in an exemplary embodiment, the joint 30 may include a first lateral portion 31, a second lateral portion 33, and a central portion 35. The first lateral portion 31 may be a portion of the joint 30 adjacent to the first plated steel sheet 10, the second lateral portion 33 may be a portion of the joint 30 adjacent to the second plated steel sheet 20, and the central portion may be a portion located between the first lateral portion 31 and the second lateral portion 33. That is, the central portion 35 of the joint 30 may be a central (middle) part of the joint 30.

In an exemplary embodiment, the first lateral portion 31, the second lateral portion 33, and the central portion 35 of the joint 30 may be provided in the same width. As an example, the width of the first lateral portion 31 may be ⅓ of the overall width of the joint 30, the width of the second lateral portion 33 may be ⅓ of the overall width of the joint 30, and the width of the central portion 35 may be ⅓ of the overall width of the joint 30. However, the present invention is not limited thereto. In this case, the overall width of the joint 30 may mean a width between a boundary between the joint 30 and the first plated steel sheet 10 and a boundary between the joint 30 and the second plated steel sheet 20.

In an exemplary embodiment, the first lateral portion 31 may include a first portion 31a, a second portion 31b, and a third portion 31c. The first portion 31a, the second portion 31b, and the third portion 31c of the first lateral portion 31 may be sequentially arranged in a direction crossing the width direction of the joint 30.

In an exemplary embodiment, the second lateral portion 33 may include a fourth portion 33a, a fifth portion 33b, and a sixth portion 33c. The fourth portion 33a, the fifth portion 33b, and the sixth portion 33c of the second lateral portion 33 may be sequentially arranged in a direction crossing the width direction of the joint 30.

In an exemplary embodiment, the central portion 35 may include a seventh portion 35a, an eighth portion 35b, and a ninth portion 35c. The seventh portion 35a, the eighth portion 35b, and the ninth portion 35c of the central portion 35 may be sequentially arranged in a direction crossing the width direction of the joint 30.

In an exemplary embodiment, the average aluminum (Al) content of the joint 30 including the first lateral portion 31, the second lateral portion 33, and the central portion 35 may be greater than 0 wt % and 1.5 wt % or less. Specifically, the average aluminum (Al) content measured in the first portion 31a to the ninth portion 35c of the joint 30 may be greater than 0 wt % and 1.5 wt % or less.

In an exemplary embodiment, a standard deviation of the aluminum (Al) content of the joint 30 including the first lateral portion 31, the second lateral portion 33, and the central portion 35 may be 0 or greater and 0.25 or less. Specifically, the standard deviation of aluminum (Al) content measured in the first portion 31a to the ninth portion 35c of the joint 30 may be 0 or greater and 0.25 or less.

When the standard deviation of the aluminum (Al) content of the joint 30 is greater than 0.25, it may mean that aluminum (Al) is unevenly distributed in the joint 30. That is, when the standard deviation of the aluminum (Al) content of the joint 30 is greater than 0.25, because the aluminum (Al) is unevenly distributed in the joint 30, localized aluminum (Al) segregation may occur in the joint 30 after hot stamping. Therefore, when the standard deviation of the aluminum (Al) content of the joint 30 is 0 or greater and 0.25 or less, because the aluminum (Al) is evenly distributed in the joint 30, localized aluminum (Al) segregation may be prevented from occurring in the joint 30, and the microstructure of the joint 30 may be made uniform after hot stamping, and at the same time, fracture may be prevented from occurring in the joint 30.

The joint 30 may be formed by aligning the lateral surface of the first plated steel sheet 10 and the lateral surface of the second plated steel sheet 20 to face each other, irradiating a laser to a boundary between the first plated steel sheet 10 and the second plated steel sheet 20, and melting the first plated steel sheet 10 and the second plated steel sheet 20. More specifically, the joint 30 connecting the first plated steel sheet 10 to the second plated steel sheet 20 at a boundary portion between the first plated steel sheet 10 and the second plated steel sheet 20 is formed by irradiating a laser beam to the boundary between the first plated steel sheet 10 and the second plated steel sheet 20.

In a specific embodiment, the laser irradiated to the boundary between the first plated steel sheet 10 and the second plated steel sheet 20 may have a power of 1 kW or greater and 20 kW or less, the radius of the beam may be 0.1 mm or greater and 1.0 mm or less, and the wavelength may be 0.1 μm or greater and 20 μm or less. Meanwhile, a joint-forming speed may be 1 m/min or greater and 10 m/min or less, preferably 15 mm/sec or greater and 170 mm/sec or less. The laser power, the beam radius, the wavelength, and the joint-forming speed will be described in detail through the embodiments below.

In a selective embodiment, a pillar wire 200 may be used in bonding the first plated steel sheet 10 to the second plated steel sheet 20. As described above, the joint 30 may include carbon (C) in an amount of 0.05 wt % or greater and less than 3.0 wt %, silicon (Si) in an amount of 0.05 wt % or greater and less than 1.0 wt %, manganese (Mn) in an amount of 1.0 wt % or greater and less than 3.0 wt %, phosphorus (P) in an amount greater than 0 and less than 0.2 wt %, sulfur (S) in an amount greater than 0 and less than 0.2 wt %, titanium (Ti) of 0.01 wt % in an amount or greater and less than 0.5 wt %, boron (B) in an amount of 0.0005 wt % or greater and less than 0.01 wt %, aluminum (Al) in an amount greater than 0 wt % and 1.5 wt % or less, the balance of iron (Fe), and other unavoidable impurities, and may selectively further include at least one of an amount of 0.01 wt % or greater and less than 1.5 wt % of niobium (Nb) and an amount of 0.05 wt % or greater and less than 2.0 wt % of chromium (Cr). When the ingredient of the joint 30 is satisfied through the ingredient content of the first plated steel sheet 10 and the second plated steel sheet 20, there is no need to use the pillar wire 200. However, when it is difficult to satisfy the above-described ingredients of the joint 30 through the ingredient content of the first plated steel sheet 10 and the second plated steel sheet 20, it may be designed to satisfy the ingredient of the joint 30 by additionally using the pillar wire 200.

Hereinafter, the aluminum-based plated blank 100 formed by using the pillar wire 200 and a method of manufacturing the same are described with reference to FIGS. 5A and 5B.

Referring to FIGS. 5A and 5B, the joint 30 may be formed by aligning the lateral surface of the first plated steel sheet 10 and the lateral surface of the second plated steel sheet 20 to face each other, supplying the pillar wire 200 to the boundary between the first plated steel sheet 10 and the second plated steel sheet 20, irradiating a laser to melt the first plated steel sheet 10, the second plated steel sheet 20, and the pillar wire 200. More specifically, the pillar wire 200 is provided to the boundary between the first plated steel sheet 10 and the second plated steel sheet 20, and a laser head 300 irradiates the laser beam 310 to form the joint 30 connecting the first plated steel sheet 10 to the second plated steel sheet 20 in the boundary portion between the first plated steel sheet 10 and the second plated steel sheet 20.

The joint 30 formed using the pillar wire 200 may include an amount greater than 0 wt % and 1.5 wt % or less of aluminum (Al), and ingredients mixed from the balance of the first plated steel sheet 10, the second plated steel sheet 20, and the pillar wire 200.

In an exemplary embodiment, the joint 30 formed by using the pillar wire 200 may include carbon (C) in an amount of 0.05 wt % or greater and less than 3.0 wt %, silicon (Si) in an amount of 0.05 wt % or greater and less than 1.0 wt %, manganese (Mn) in an amount of 1.0 wt % or greater and less than 3.0 wt %, phosphorus (P) in an amount greater than 0 and less than 0.2 wt %, sulfur (S) in an amount greater than 0 and less than 0.2 wt %, titanium (Ti) in an amount of 0.01 wt % or greater and less than 0.5 wt %, boron (B) in an amount of 0.0005 wt % and greater than 0.01 wt %, aluminum (Al) in an amount greater than 0 wt % and 1.5 wt % or less, the balance of iron (Fe) and other unavoidable impurities. In addition, the joint 30 may further include one or more of niobium (Nb) in an amount of 0.01 wt % or greater and less than 1.5 wt % and chromium (Cr) in an amount of 0.05 wt % or greater and less than 2.0 wt %.

The joint 30 may include an amount greater than 0 wt % and 1.5 wt % or less of aluminum (Al). The content of aluminum (Al) included in the joint 30 may be a sum of aluminum (Al) mixed from the first plated steel sheet 10, the second plated steel sheet 20, and the pillar wire 200 that are melted. When the aluminum (Al) content of the joint 30 is greater than 1.5 wt %, the joint may be softened, the martensite fraction of the joint may be lowered after hot stamping, and the mechanical properties of the aluminum-based plating blank 100 may be deteriorated. In addition, when an impact is applied after hot stamping due to segregation of aluminum (Al) in the joint 30, the impact may not be absorbed in the first plated steel sheet 10 and fracture may occur in the joint portion 30.

The joint 30 may include an amount of 0.05 wt % or greater and less than 3.0 wt % of carbon (C). The content of carbon (C) included in the joint 30 may be a sum of carbon (C) mixed from the first plated steel sheet 10, the second plated steel sheet 20, and the pillar wire 200 that are melted. When the carbon (C) content of the joint 30 is less than 0.05 wt %, because the joint 30 is softened and the hardness of the joint 30 is less than those of the first plated steel sheet 10 and the second plated steel sheet 20, breakage may occur in the joint 30. On the other hand, when the carbon (C) content is 1.0 wt % or greater, the hardness of the joint 30 is excessively increased and brittle fracture may occur in the joint 30 due to an external impact or the like.

The joint 30 may include an amount of 0.05 wt % or greater and 1.0 wt % or less of silicon (C). The content of silicon (Si) included in the joint 30 may be a sum of silicon (Si) mixed from the first plated steel sheet 10, the second plated steel sheet 20, and the pillar wire 200 that are melted. When the content of silicon (Si) included in the joint 30 is less than 0.05 wt %, brittle fracture may occur in the joint 30. On the other hand, when the content of silicon (Si) included in the joint 30 is 1.0 wt % or greater, slag may be generated on the surface of the bead.

The joint 30 may include an amount of 1.0 wt % or greater and less than 3.0 wt % of manganese (Mn). The content of manganese (Mn) included in the joint 30 may be a sum of manganese (Mn) mixed from the first plated steel sheet 10, the second plated steel sheet 20, and the pillar wire 200 that are melted. When the manganese content of the joint 30 is less than 1.0 wt %, because the joint 30 is softened during the hot stamping and the hardness of the joint 30 is less than those of the first plated steel sheet 10 and the second plated steel sheet 20, breakage may occur in the joint 30. On the other hand, when the content of manganese (Mn) is 3.0 wt % or greater, the hardness of the joint 30 is excessively increased and brittle fracture may occur in the joint 30 due to an external impact and the like, and the quality of the shape of the joint 30 may be deteriorated and cracks may occur in the joint 30 due to the drop in the viscosity of the joint 30 while the joint 30 is melted, and the expansion of the coefficient of expansion during transformation into a solid phase.

The joint 30 may include an amount greater than 0 and less than 0.2 wt % of phosphorus (P). The content of phosphorus (P) included in the joint 30 may be a sum of phosphorus (P) mixed from the first plated steel sheet 10, the second plated steel sheet 20, and the pillar wire 200 that are melted. When the phosphorus (P) content of the joint 30 is 0.2 wt % or greater, brittle fracture due to segregation may occur in the joint 30.

The joint 30 may include an amount greater than 0 and less than 0.2 wt % of sulfur (S). The content of sulfur (S) included in the joint 30 may be a sum of sulfur (S) mixed from the first plated steel sheet 10, the second plated steel sheet 20, and the pillar wire 200 that are melted. When the content of sulfur (S) in the joint 30 is 0.2 wt % or greater, cracks may occur in the joint 30 due to the formation of inclusions.

The joint 30 may include an amount of 0.01 wt % or greater and less than 0.5 wt % of titanium (Ti). The content of titanium (Ti) included in the joint 30 may be a sum of titanium (Ti) mixed from the first plated steel sheet 10, the second plated steel sheet 20, and the pillar wire 200 that are melted. When the titanium (Ti) content of the joint 30 is less than 0.01 wt %, because the joint 30 is softened during hot stamping and the hardness of the joint 30 is less than those of the first plated steel sheet 10 and the second plated steel sheet 20, the joint 30 may be broken. On the other hand, when the titanium (Ti) content of the joint 30 is 0.5 wt % or greater, brittle fracture may occur in the joint 30.

The joint 30 may include an amount of 0.0005 wt % or greater and less than 0.01 wt % of boron (B). The content of boron (B) included in the joint 30 may be a sum of boron (B) mixed from the first plated steel sheet 10, the second plated steel sheet 20, and the pillar wire 200 that are melted. When the boron (B) content of the joint 30 is less than 0.0005 wt %, because the joint 30 is softened during hot stamping and the hardness of the joint 30 is less than those of the first plated steel sheet 10 and the second plated steel sheet 20, the joint 30 may be broken. On the other hand, when the boron (B) content of the joint 30 is 0.01 wt % or greater, brittle fracture may occur in the joint 30.

As described above, because the joint 30 is formed by using the pillar wire 200, when an alloy composition of each of the first plated steel sheet 10 and the second plated steel sheet 20 and content of aluminum (Al) included in the first plated layer 14 and the second plated layer 24 are taken into account, it may be prevented that ferrite is excessively formed in the joint 30 after hot stamping and the strength of the joint 30 is reduced. In addition, even when the gap between the first plated steel sheet 10 and the second plated steel sheet 20 is large, the pillar wire 200 may be used. In addition, the pillar wire 200 may be used even when a blank of a closed loop type with an open central portion, such as a frame shape, is formed by bonding a plurality of plated steel sheets.

The joint 30 is formed by melting the first plated steel sheet 10, the second plated steel sheet 20, and the filler wire 200 by using the laser beam 310, and through this process, the ingredients of the first plated layer 14 of the first plated steel sheet 10 and the second plated layer 24 of the second plated steel sheet 20 penetrate into the joint 30. Accordingly, the composition of the pillar wire 200 may be determined by taking into account the penetration of the ingredients of the first plated layer 14 and the second plated layer 24 during laser welding.

In an exemplary embodiment, the pillar wire 200 may include an austenite stabilizing element. As an example, the pillar wire 200 may include one or more austenite stabilizing elements of carbon (C) and manganese (Mn), the remainder of iron (Fe), and unavoidable impurities. In this case, the content of carbon (C) in the pillar wire 200 may be 0.1 wt % or greater and 1.0 wt % or less, and the content of manganese (Mn) may be 0.1 wt % or greater and 10.0 wt % or less. The pillar wire 200 may penetrate into the joint 30, and the ingredients of the joint 30 may be adjusted.

In a specific embodiment, the pillar wire 200 may include carbon (C) in an amount of 0.1 wt % or greater and 1.0 wt % or less, silicon (Si) in an amount of 0.1 wt % or greater to 2.0 wt % or less, manganese (Mn) in an amount of 0.1 wt % or greater to 10.0 wt % or less, phosphorus (P) in an amount greater than 0 and 0.1 wt % or less, sulfur (S) in an amount greater than 0 and 0.1 wt % or less, the balance of iron (Fe), and other unavoidable impurities. Preferably, the pillar wire 200 may include carbon (C) in an amount of 0.4 wt % or greater and 0.9 wt % or less, silicon (Si) in an amount of 0.15 wt % or greater to 0.35 wt % or less, manganese (Mn) in an amount of 0.3 wt % or greater to 4.5 wt % or less, phosphorus (P) in an amount greater than 0 and 0.03 wt % or less, sulfur (S) in an amount greater than 0 and 0.03 wt % or less, the balance of iron (Fe), and other unavoidable impurities.

The pillar wire 200 may include an amount of 0.1 wt % or greater and 1.0 wt % or less of carbon (C). Preferably, the pillar wire 200 may include an amount of 0.4 wt % or greater and 0.9 wt % or less of carbon (C). When the carbon (C) content included in the pillar wire 200 is less than 0.4 wt %, because the joint 30 is softened and the hardness of the joint 30 is less than those of the first plated steel sheet 10 and the second plated steel sheet 20, breakage may occur in the joint 30. On the other hand, when the carbon (C) content included in the pillar wire 200 is greater than 0.9 wt %, brittle fracture may occur in the joint 30.

The pillar wire 200 may include an amount of 0.1 wt % or greater and 2.0 wt % or less of silicon (Si). Preferably, the pillar wire 200 may include an amount of 0.15 wt % or greater and 0.35 wt % or less of silicon (Si). When the content of silicon (Si) included in the pillar wire 200 is less than 0.15 wt %, brittle fracture may occur in the joint 30. On the other hand, when the carbon (Si) content included in the pillar wire 200 is greater than 0.35 wt %, slag may occur on the surface of the bead.

The pillar wire 200 may include an amount of 0.1 wt % or greater and 10.0 wt % or less of manganese (Mn). Preferably, the pillar wire 200 may include an amount of 0.3 wt % or greater and 4.5 wt % or less of manganese (Mn). When the manganese (Mn) content included in the pillar wire 200 is less than 0.3 wt %, because the joint 30 is softened and the hardness of the joint 30 is less than those of the first plated steel sheet 10 and the second plated steel sheet 20, breakage may occur in the joint 30. On the other hand, when the manganese (Mn) content included in the pillar wire 200 is greater than 4.5 wt %, brittle fracture may occur in the joint 30.

The pillar wire 200 may include an amount greater than 0 and 0.1 wt % or less of phosphorus (P). Preferably, the pillar wire 200 may include an amount greater than 0 and 0.03 wt % or less of phosphorus (P). When the phosphorus (P) content included in the pillar wire 200 is greater than 0.03 wt %, brittle fracture due to segregation may occur.

The pillar wire 200 may include an amount greater than 0 and 0.1 wt % or less of sulfur (S). Preferably, the pillar wire 200 may include an amount greater than 0 and 0.03 wt % or less of sulfur (P). When the content of sulfur (S) included in the pillar wire 200 is greater than 0.03 wt %, cracks may occur due to formation of inclusions.

Specifically, even though the aluminum (Al) of the first plated layer 14 and the second plated layer 24 is mixed in the molten pool of the joint 30, the joint 30 may have a martensitic structure of 90% or greater by area fraction after hot stamping, preferably a full martensitic structure due to the austenite stabilizing element added to the pillar wire 200. That is, according to the present invention, without removing the first plated layer 14 and the second plated layer 24, even though the ingredients of the first plated layer 14 and the second plated layer 24 are mixed into the joint 30, the hardness and strength of the joint 30 may be prevented from being deteriorated, and thus, fracture of the joint 30 may be prevented.

In addition, when the ingredients of the first plated steel sheet 10 and the second plated steel sheet 20 are different from each other, even though the aluminum (Al) of the first plated layer 14 and the second plated layer 24 is mixed in the molten pool of the joint 30, fracture in the joint 30 may be prevented by preventing the microstructure of the joint 30 after hot stamping from excessively including ferrite due to the austenite stabilizing element added to the pillar wire 200.

In an example, FIG. 5A schematically shows a process of forming the joint 30 while the first and second plated steel sheets 10 and 20 move. Referring to FIG. 5A, with the laser head 300 fixed, the pillar wire 200 may be supplied toward portions of the first plated steel sheet 10 and the second plated steel sheet 20 facing each other, and the laser beam 310 may be irradiated. Meanwhile, while the first and second plated steel sheets 10 and 20 move in parallel in a direction D1 opposite to a direction Y2 in which the joint 30 is formed, the laser beam 310 is irradiated to form the joint 30.

In another example, FIG. 5B schematically shows a process of forming the joint 30 while the laser head 300 moves. Referring to FIG. 5B, with the first plated steel sheet 10 and the second plated steel sheet 20 in a stationary state, the pillar wire 200 is supplied toward the portions of the first plated steel sheet 10 and the second plated steel sheet 20 facing each other, and the laser head 300 may move and the laser beam 310 may be irradiated. In this case, while the laser head 300 moves in parallel in the same direction as the direction Y2 in which the joint 30 is formed, the laser beam 310 is irradiated to form the joint 30.

In a specific embodiment, when the aluminum-based plated blank 100 is manufactured, the joint-forming speed should be 1 m/min or greater, and the power of the laser beam 310 should be 20 kW or less to ensure minimum productivity and business feasibility. The greater the power of the laser beam 310, the better, but in order to implement power exceeding 20 kW, because a high-performance facility is required, the size of the facility increases and the cost of the facility increases. In addition, in order to secure the minimum productivity, it is required to maintain the forming speed of the joint 30 at 1 m/min or greater. The joint-forming speed refers to the displacement per unit time in which the laser head 300 relatively moves in parallel to the joint-forming direction Y2.

In a specific embodiment, the joint-forming speed may be 1 to 10 m/min. When the joint-forming speed exceeds 10 m/min, the first and second plated layers 14 and 24 and the first and second base irons 12 and 22 may not be sufficiently melted by the laser beam 310, and the ingredients may not be uniformly distributed at the joint.

In a specific embodiment, the joint-forming speed may be 15 to 170 mm/sec. Preferably, the joint-forming speed may be 1 to 7 mm/sec. Preferably, the joint-forming speed may be 15 to 120 mm/sec.

In a specific embodiment, the radius of the laser beam 310 may be 0.1 to 1.0 mm. In order for the radius of the laser beam 310 to exceed 1.0 mm, the distance between the pillar wire 200 and the first and second plated steel sheets 10 and 20 and the laser head 300 should be close. In this case, a space to which the pillar wire 200 is supplied, or a space for replacing the pillar wire 200 in the case where the pillar wire 200 is consumed, is not sufficient, and thus the efficiency of the manufacturing process may be reduced. In addition, energy density at a portion where the first and second plated steel sheets 10 and 20 face each other may be reduced. On the other hand, the radius of the laser beam 310 is less than 0.1 mm, the width of the joint may be narrow.

In addition, when the power of the laser beam 310 is less than 1 kW, energy transferred to the first and second plated steel sheets 10 and 20 is insufficient, and thus, even when the laser beam 310 is irradiated, there may be a portion where the ingredients of the first and second plates layers 14 and 24 are not sufficiently diluted in the ingredients of the first and second base irons 12 and 22.

In a specific embodiment, the wavelength of the laser beam 310 may be 0.1 μm to 20 μm. When the wavelength of the laser beam 310 exceeds 20 μm, the laser absorptivity of the first and second plated steel sheets 10 and 20 is decreased, and melting is not properly performed. Accordingly, it is difficult to form the joint 30, and the ingredients may not be uniformly distributed in the joint 30. In addition, when the pillar wire 200 is used, it is difficult to uniformly distribute the ingredients mixed from the first and second plated steel sheets 10 and 20 and the pillar wire 200 in the joint 30.

In a selective embodiment, while the laser beam 310 is irradiated, a first laser beam and a second laser beam apart from each other may be irradiated. As an example, the first laser beam melts the pillar wire 200, the first plated layer 14, the second plated layer 24, the first base iron 12, and the second base iron 22, and the second laser beam maintains the molted state, and thus, the melted portion may be uniformly agitated, the occurrence of the segregation of the joint 30 may be prevented, and the quality and mechanical properties may be excellent. Meanwhile, when the first laser beam and the second laser beam are used, a sum of the powers of the first laser beam and the second laser beam may be 1 to 20 kW.

In an exemplary embodiment, the value obtained by multiplying the thickness of the joint 30 and the tensile strength of the joint 30 after hot stamping may be greater than at least one of a value obtained by multiplying the thickness of the first plated steel sheet 10 and the tensile strength of the first plated steel sheet 10 after hot stamping, and a value obtained by multiplying the thickness of the second plated steel sheet 20 and the tensile strength of the second plated steel sheet 20 after hot stamping. Specifically, the value obtained by multiplying a maximum value of the thickness of the joint 30 and the tensile strength of the joint 30 after hot stamping may be greater than a value obtained by multiplying the thickness of the first plated steel sheet 10 and the tensile strength of the first plated steel sheet 10 after hot stamping, or greater than a value obtained by multiplying the thickness of the second plated steel sheet 20 and the tensile strength of the second plated steel sheet 20 after hot stamping. Through this, it is possible to cause the first plated steel sheet 10 or the second plated steel sheet 20 to break without causing the joint 30 to break, as considered when designing a vehicle body. In an exemplary embodiment according to the present invention, the value obtained by multiplying the thickness of the first plated steel sheet 10 by the tensile strength of the first plated steel sheet 10 after hot stamping is less than a value obtained by multiplying the thickness of the second plated steel sheet 20 by the tensile strength of the second plated steel sheet 20 after hot stamping, so that the impact energy applied to the aluminum-based plated blank 100 may be absorbed by the first plated steel sheet 10.

Hot stamping parts may be manufactured by hot-stamping the aluminum plated blank 100 formed based on the above description.

Specifically, in the hot stamping process, the aluminum-based plated blank 100 may be press-formed by heating the aluminum-based plated blank 100 to a temperature of Ac3 to 980° C. at a temperature increase speed of 3° C./sec or greater. At this case, Ac3 should be set to be equal to or greater than Ac3 of the steel sheet having a greater tensile strength among the first plated steel sheet 10 and the second plated steel sheet 20. Thereafter, hot stamping molding may be performed by cooling to Ms (+50° C.) at a cooling speed of 30° C./s or greater.

In an exemplary embodiment, after hot stamping, the first plated steel sheet 10, that is, the first plated steel sheet 10 included in the hot stamping part may include martensite and tempered martensite of 70% or greater, 30% or less of bainite and ferrite, and 10% or less of other unavoidable structures, carbides, and inclusions in the remainder by area fraction (%). The carbide may include the iron (Fe)-based carbide described with reference to FIG. 1. The inclusion may include the MnS-based inclusion described with reference to FIGS. 2A and 2B. The iron (Fe)-based carbide and MnS-based inclusions have little influence caused by the hot stamping process, and may remain in the parts after the hot stamping process. As described above, the bendability may be improved by including the structure of the first plated steel sheet 10 in the above-described fraction range.

In this case, the bendability of the first plated steel sheet 10 may be more efficiently secured by refining the grains of the structure of the first plated steel sheet 10. As an example, it is preferable that the size of the average grain size of the structure of the first plated steel sheet 10 is controlled to 5 μm to 20 μm, more specifically 8 μm to 12 μm.

In the hot stamping parts manufactured through the hot stamping process, the tensile strength of the first plated steel sheet 10 may be about 750 Mpa or greater, more specifically, 750 Mpa or greater and less than 1180 MPa. In addition, the yield strength of the first plated steel sheet 10 after hot stamping may be about 500 MPa or greater, more specifically, 500 MPa to 900 MPa. In addition, the elongation of the first plated steel sheet 10 after hot stamping may be 7% or greater, more preferably 7% to 12%. In addition, the V-bending angle of the first plated steel sheet 10 after hot stamping may be 80 degrees or greater, more preferably 80 degrees to 100 degrees.

As described above, when the physical properties of the first plated steel sheet 10 after hot stamping satisfy the above-described range, it may mean that the first plated steel sheet 10 has excellent impact absorption ability. Therefore, in the aluminum-based plated blank 100 formed by bonding the first plated steel sheet 10 to the second plated steel sheet 20, the impact applied to the aluminum-based plated blank 100 may be absorbed by the first plated steel sheet 10.

The tensile strength of the second plated steel sheet 20 may be greater than that of the first plated steel sheet 10. The tensile strength of the second plated steel sheet 20 after hot stamping may be 1350 MPa or greater and 2300 MPa or less. More specifically, as described above, the second base iron 22 of the second plated steel sheet 20 may include a second alloy composition, a third alloy composition, or a fourth alloy composition. The tensile strength of the second plated steel sheet 20 including the second alloy composition after hot stamping may be 1350 MPa to 2300 MPa. In addition, the tensile strength of the second plated steel sheet 20 including the third alloy composition after hot stamping may be 1350 MPa to 1680 MPa. In addition, the tensile strength of the second plated steel sheet 20 including the fourth alloy composition after hot stamping may be 1680 MPa to 2300 MPa.

In an exemplary embodiment, after hot stamping, the second plated steel sheet 20, that is, the second plated steel sheet 20 included in the hot stamping parts, has 90% or greater of martensite and other unavoidable structures of the remaining amount as an area fraction (%).

Hereinafter, the configuration and operation of the present invention will be described in more detail through preferred embodiments of the present invention. However, these are presented as preferred examples of the present invention and cannot be construed as limiting the present invention in any sense.

Table 1 below is a measured table showing the maximum length (μm) of MnS-based inclusions, the average length of MnS-based inclusions (μm), and the average density of MnS-based inclusions (pieces/mm²) of each of Embodiments of the present invention and Comparative Examples. The '½ point in width direction' and '¼ point in width direction ¼' measured in Table 1 below were measured in the same manner as described with reference to FIGS. 1, 2A, and 2B.

TABLE 1

| | 1/2 point in width direction | | | 1/4 point in width direction | | | |
|---|---|---|---|---|---|---|---|
| | Maximum length Of MnS inclusion (μm) | Average length Of MnS inclusion (μm) | Average density Of MnS inclusion (pieces/mm²) | Maximum length Of MnS inclusion (μm) | Average length Of MnS inclusion (μm) | Average density Of MnS inclusion (pieces/mm²) | V-bending angle |
| Embodiment 1 | 65 | 15 | 4.7 | 30 | 6 | 1.5 | 127° |
| Embodiment 2 | 87 | 32 | 0.4 | 31 | 20 | 0.3 | 121° |
| Embodiment 3 | 91 | 76 | 38.3 | 85 | 65 | 19.3 | 101° |
| Embodiment 4 | 198 | 16 | 3.2 | 70 | 13 | 2.9 | 116° |
| Embodiment 5 | 296 | 150 | 12.2 | 125 | 95 | 7.9 | 98° |
| Embodiment 6 | 491 | 88 | 28.6 | 196 | 55 | 13.6 | 85° |
| Comparative Example 1 | 526 | 81 | 26.7 | 216 | 53 | 15.1 | 78° |
| Comparative Example 2 | 183 | 221 | 4.0 | 67 | 115 | 2.2 | 77° |
| Comparative Example 3 | 89 | 80 | 42.0 | 90 | 59 | 22.8 | 72° |

As may be seen with reference to Table 1, in Embodiments 1 to 6 of the present invention, the maximum length of the MnS-based inclusions at a ½ point of the width of the steel sheet for hot press was found to be 500 μm or less, and the maximum length of the MnS-based inclusions at a ¼ point of the width of the steel sheet for hot press was found to be 200 μm or less. In Embodiments 1 to 6 of the present invention, the average length of the MnS-based inclusions at a ½ point of the width of the steel sheet for hot press was found to be 200 μm or less, and the maximum length of the MnS-based inclusions at a ¼ point of the width of the steel sheet for hot press was found to be 100 μm or less. In Embodiments 1 to 6 of the present invention, the average density of the MnS-based inclusions at a ½ point of the width of the steel sheet for hot press was found to be 40 pieces/mm² or less, and the average density of the MnS-based inclusions at a ¼ point of the width of the steel sheet for hot press was found to be 20 pieces/mm². In Embodiments 1 to 6 satisfying the above range, a V-bending angle of 80° or greater may be secured, and it may be found that excellent bendability and delayed fracture properties are obtained.

On the other hand, in Comparative Examples 1 to 3, it may be found that the maximum length of the MnS-based inclusions, the average length of the MnS-based inclusions, and/or the average density of the MnS-based inclusions deviate the ranges of Embodiments 1 to 6. Comparative Examples 1 to 3 were found to have a V-bending angle of less than 80°. Therefore, in Comparative Examples 1 to 3, it may be found that it is difficult to implement sufficient bendability and delayed fracture properties to be designed by the present invention.

While the present invention has been described with reference to an exemplary embodiment shown in the drawings, it will be understood by those of ordinary knowledge in the art that these are more examples and various changes in form and details may be made therein. Accordingly, the true technical scope of the present invention should be defined by the spirit of the appended claims.

The invention claimed is:

1. A steel sheet for hot press, comprising: carbon (C) in an amount of 0.03 to 0.15 wt %, silicon (Si) in an amount of 0.1 to 1.5 wt %, manganese (Mn) in an amount of 1.0 to 2.0 wt %, phosphorus (P) in an amount of 0.1 wt % or less, sulfur (S) in an amount of 0.01 wt % or less, boron (B) in an amount of 0.0005 to 0.005 wt %, a sum of one or more of titanium (Ti), niobium (Nb), and vanadium (V) in an amount of 0.01 to 1.0 wt %, chromium (Cr) in an amount of 0.01 to 0.5 wt %, the balance of iron (Fe), and other unavoidable impurities,
wherein the steel sheet for hot press comprises MnS-based inclusions, and an area fraction of the MnS-based inclusions is 5% or less.

2. The steel sheet of claim 1, wherein the steel sheet for hot press has a width perpendicular to a rolling direction, and
a maximum length of the MnS-based inclusion is 200 μm or less at a ¼ point of the width.

3. The steel sheet of claim 1, wherein the steel sheet for hot press has a width perpendicular to a rolling direction, and
a maximum length of the MnS-based inclusion is 500 μm or less at a ½ point of the width.

4. The steel sheet of claim 1, wherein the steel sheet for hot press has a width in a direction perpendicular to a rolling direction, and
an average length of the MnS-based inclusion is 100 μm or less at a ¼ point of the width.

5. The steel sheet of claim 1, wherein the steel sheet for hot press has a width in a direction perpendicular to a rolling direction, and
an average length of the MnS-based inclusion is 200 μm or less at a ½ point of the width.

6. The steel sheet of claim 1, wherein the steel sheet for hot press has a width in a direction perpendicular to a rolling direction, and
an average density of the MnS-based inclusion is 20 pieces/mm$^2$ or less at a ¼ point of the width.

7. The steel sheet of claim 1, wherein the steel sheet for hot press has a width perpendicular to a rolling direction, and
an average density of the MnS-based inclusion is 40 pieces/mm$^2$ or less at a ½ point of the width.

8. The steel sheet of claim 1, wherein the steel sheet for hot press comprises an amount of 50 to 90% of ferrite and an amount of 30% or less of pearlite, as an area fraction (%).

9. The steel sheet of claim 8, wherein an average grain size of the ferrite is 1 to 10 μm.

10. The steel sheet of claim 1, further comprising an iron (Fe)-based carbide, wherein an average diameter of the iron (Fe)-based carbide is 100 nm or less.

11. An aluminum-based plated blank comprising:
a first plated steel sheet;
a second plated steel sheet connected to the first plated steel sheet; and
a joint connecting the first plated steel sheet and the second plated steel sheet at a boundary between the first plated steel sheet and the second plated steel sheet,
wherein the first plated steel sheet comprises a first base iron and a first plated layer attached on at least one surface of the first base iron and including aluminum (Al), the second plated steel sheet comprises a second base iron and a second plated layer attached on at least one surface of the second base iron and including aluminum (Al),
the first base iron comprises carbon (C) in amount of 0.03 to 0.15 wt %, silicon (Si) in amount of 0.1 to 1.5 wt %, manganese (Mn) in amount of 1.0 to 2.0 wt %, phosphorus (P) in amount of 0.1 wt % or less, sulfur (S) in amount of 0.01 wt % or less, boron (B) in amount of 0.0005 to 0.005 wt %, a sum of one or more of titanium (Ti), niobium (Nb), and vanadium (V) in an amount of 0.01 to 1.0 wt %, chromium (Cr) in amount of 0.01 to 0.5 wt %, the balance of iron (Fe), and other unavoidable impurities, and
the second base iron comprises carbon (C) in amount of 0.15 wt % or greater, and an area fraction of MnS-based inclusions in the first plated steel sheet is 5% or less.

12. The aluminum-based plated blank of claim 11, wherein a value obtained by multiplying a tensile strength of the first plated steel sheet by a thickness of the first plated steel sheet is less than a value obtained by multiplying a tensile strength of the second plated steel sheet by a thickness of the second plated steel sheet.

13. The aluminum-based plated blank of claim 11, wherein the second base iron comprises carbon (C) in amount of 0.15 to 0.5 wt %, silicon (Si) in amount of 0.1 to 0.8 wt %, manganese (Mn) in amount of 0.3 to 2.0 wt %, phosphorus (P) in amount of 0.05 wt % or less, sulfur (S) in amount of 0.01 wt % or less, boron (B) in amount of 0.001 to 0.005 wt %, the balance of iron (Fe), and other unavoidable impurities, and
further optionally comprises one or more of chromium (Cr) in amount of 0.01 to 0.5 wt %, titanium (Ti) in amount of 0.01 to 0.1 wt %, niobium (Nb) in amount of 0.01 to 0.1 wt %, vanadium (V) in amount of 0.01 to 0.1 wt %, molybdenum (Mo) in amount of 0.01 to 0.5 wt %, nickel (Ni) in amount of 0.01 to 0.5 wt %, and calcium (Ca) in amount of 0.0001 to 0.005 wt %.

14. The aluminum-based plated blank of claim 11, wherein the second base iron comprises carbon (C) in amount of 0.2 to 0.3 wt %, silicon (Si) in amount of 0.1 to 0.8 wt %, manganese (Mn) in amount of 0.8 to 1.5 wt %, phosphorus (P) in an amount of 0.05 wt % or less, sulfur (S) in amount of 0.01 wt % or less, boron (B) in amount of 0.001 to 0.005 wt %, the balance of iron (Fe), and other unavoidable impurities, and
further optionally comprises one or more of chromium (Cr) in amount of 0.05 to 0.3 wt %, titanium (Ti) in amount of 0.01 to 0.1 wt %, and calcium (Ca) in an amount of 0.0001 to 0.003 wt %.

15. The aluminum-based plated blank of claim 11, wherein the second base iron comprises carbon (C) in an amount of 0.25 to 0.5 wt %, silicon (Si) in an amount of 0.1 to 0.8 wt %, manganese (Mn) in an amount of 0.4 to 1.8 wt %, phosphorus (P) in an amount of 0.05 wt % or less, sulfur (S) in an amount of 0.01 wt % or less, boron (B) in an amount of 0.001 to 0.005 wt %, the balance of iron (Fe), and other unavoidable impurities, and further optionally comprises one or more of chromium (Cr) in an amount of 0.01 to 0.5 wt %, titanium (Ti) in an amount of 0.01 to 0.1 wt %, niobium (Nb) in an amount of 0.01 to 0.1 wt %, molybdenum (Mo) in an amount of 0.01 to 0.4 wt %, and nickel (Ni) in an amount of 0.01 to 0.5 wt %.

16. The aluminum-based plated blank of claim 11, wherein the first plated steel sheet has a width in a direction perpendicular to a rolling direction, and a maximum length of the MnS-based inclusions measured at a cut surface at a point ½ of the width is 500 μm or less.

17. The aluminum-based plated blank of claim 11, wherein the first plated steel sheet has a width in a direction perpendicular to a rolling direction, and an average length of the MnS-based inclusions measured at a cut surface at a point ½ of the width is 200 μm or less.

18. The aluminum-based plated blank of claim 11, wherein the first plated steel sheet has a width in a direction perpendicular to a rolling direction, and and an average density of the MnS-based inclusions measured at a cut surface at a point ½ of the width is 40 pieces/mm² or less.

19. The aluminum-based plated blank of claim 11, wherein the joint comprises carbon (C) in an amount of 0.05 wt % or greater and less than 3.0 wt %, silicon (Si) in an amount of 0.01 wt % or greater and less than 1.0 wt %, manganese (Mn) in an amount of 0.5 wt % or greater and less than 3.0 wt %, phosphorus (P) in an amount greater than 0 and less than 0.2 wt %, sulfur (S) in an amount greater than 0 and less than 0.2 wt %, titanium (Ti) in an amount greater than 0 wt % and less than 0.5 wt %, boron (B) in an amount of 0.0005 wt % or greater and less than 0.01 wt %, aluminum (Al) in an amount greater than 0 wt % and less than 1.5 wt %, the balance of iron (Fe), and other unavoidable impurities.

20. The aluminum-based plated blank of claim 11, wherein the first plated steel sheet further comprises an iron (Fe)-based carbide, and an average diameter of the iron (Fe)-based carbide is 100 nm or less.

* * * * *